July 26, 1938.  T. R. HARRISON ET AL  2,125,109
CONTROL APPARATUS
Filed July 18, 1935   10 Sheets-Sheet 1

INVENTOR.
THOMAS R. HARRISON
FREDERICK W. SIDE
BY
*J. E. Hubbell*
ATTORNEY

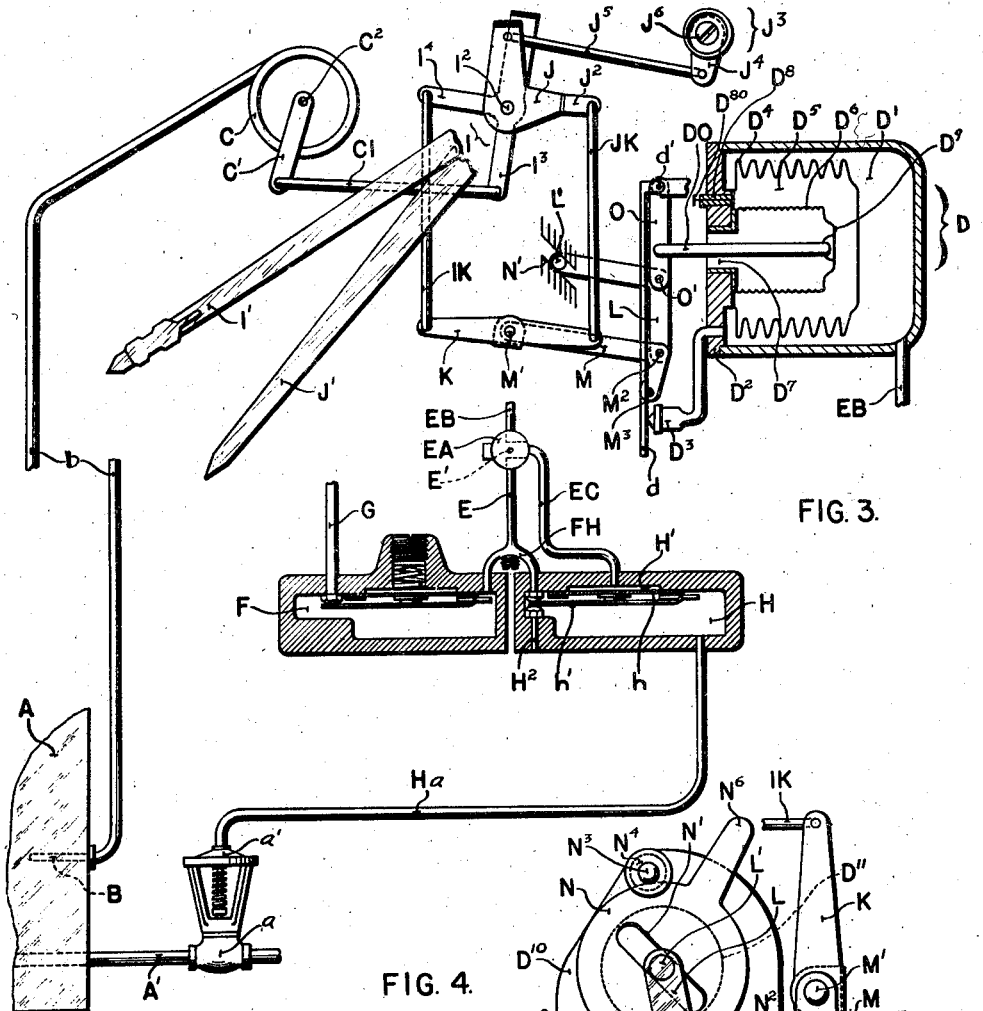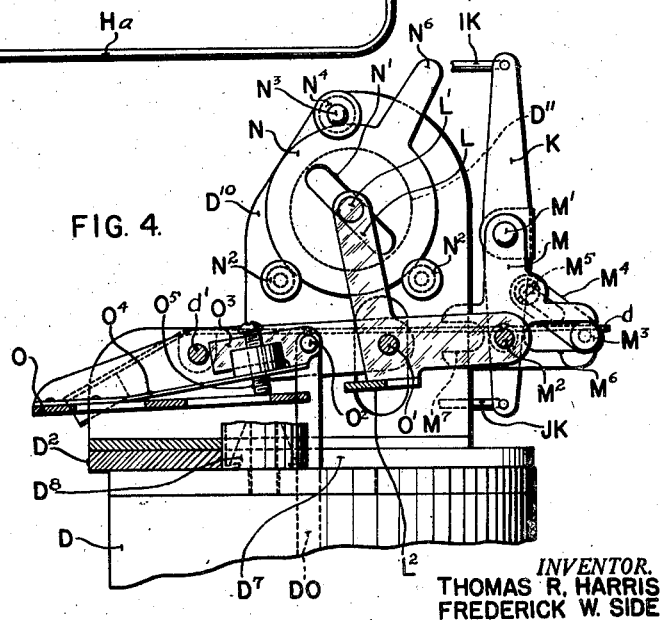

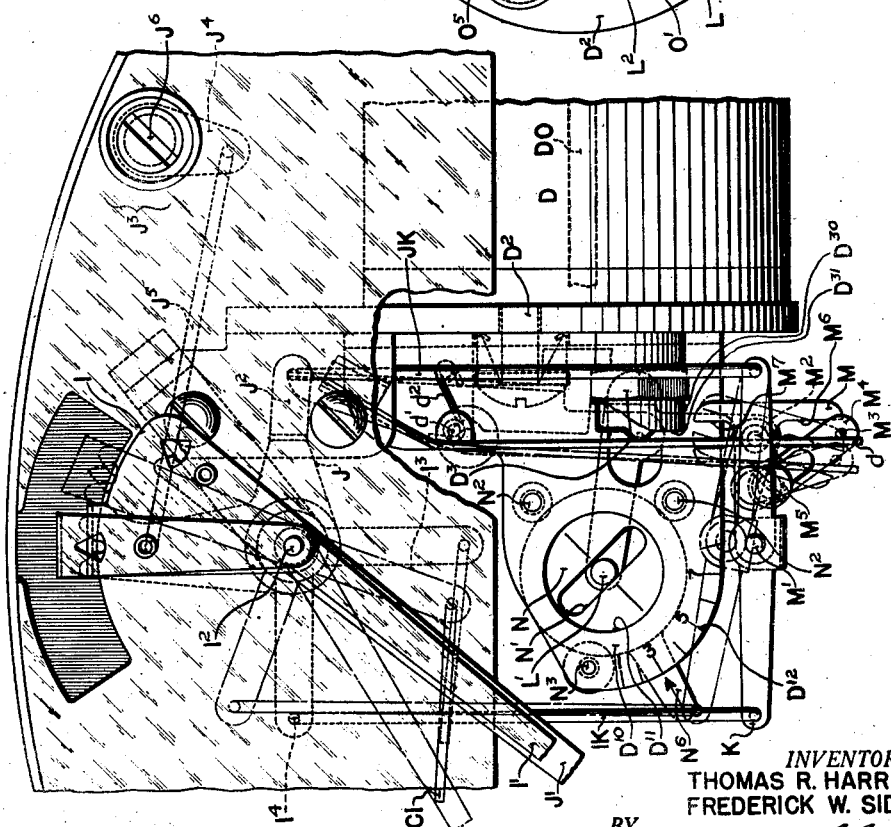

INVENTOR.
THOMAS R. HARRISON
FREDERICK W. SIDE
BY J. E. Hubbell
ATTORNEY

INVENTOR.
THOMAS R. HARRISON
FREDERICK W. SIDE
BY J. E. Hubbell
ATTORNEY

July 26, 1938.  T. R. HARRISON ET AL  2,125,109
CONTROL APPARATUS
Filed July 18, 1935  10 Sheets-Sheet 7

INVENTOR.
THOMAS R. HARRISON
FREDERICK W. SIDE
BY J. E. Hubbell
ATTORNEY

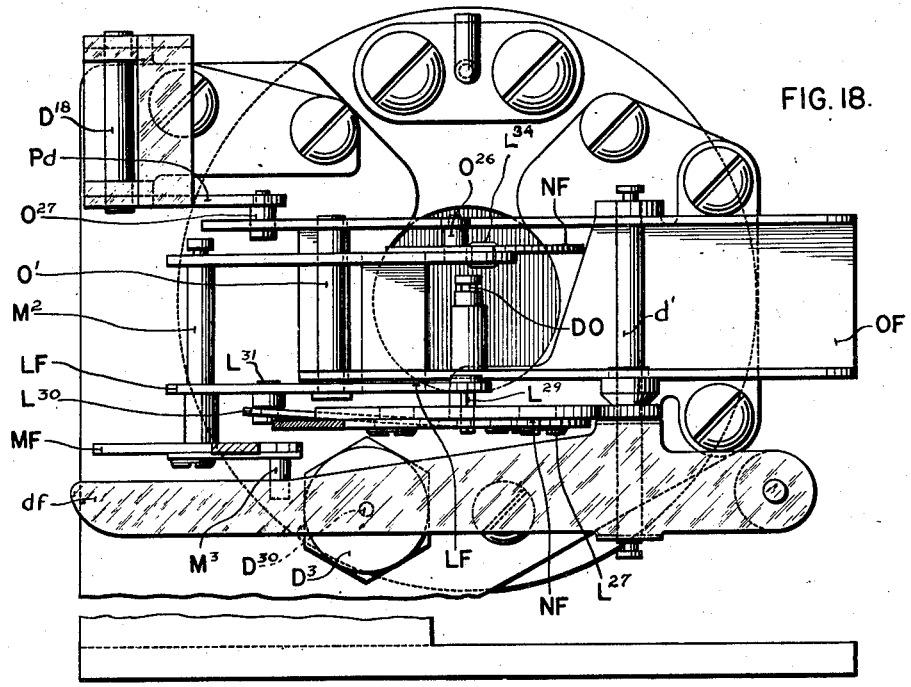
FIG. 18.
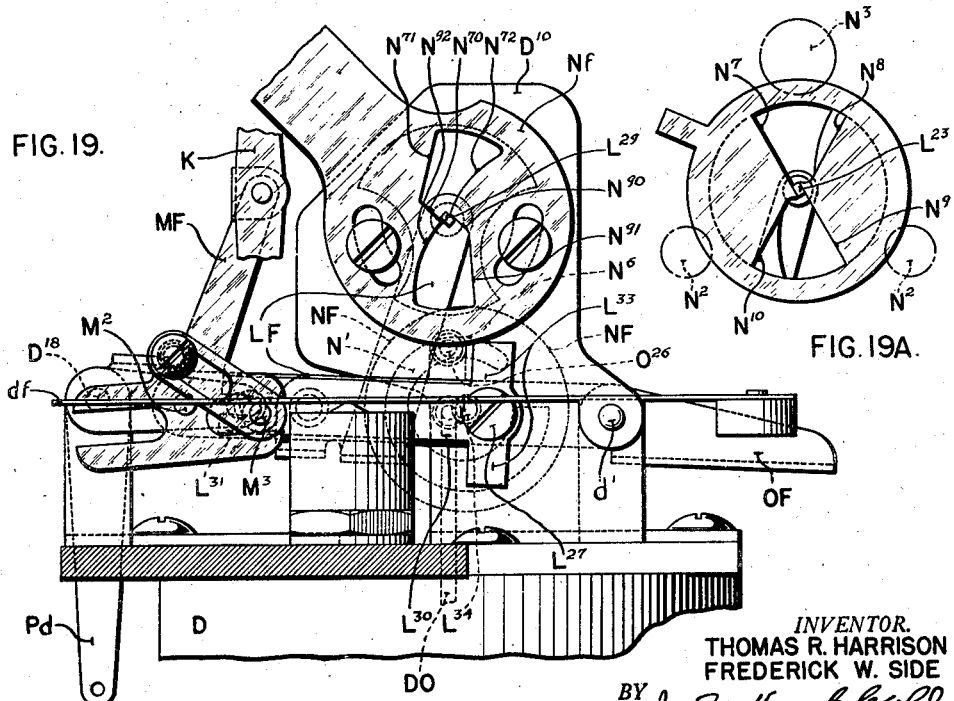
FIG. 19.
FIG. 19A.
INVENTOR.
THOMAS R. HARRISON
FREDERICK W. SIDE
BY J. E. Hubbell
ATTORNEY Patented July 26, 1938

2,125,109

UNITED STATES PATENT OFFICE 2,125,109

CONTROL APPARATUS

Thomas R. Harrison, Wyncote, and Frederick W. Side, Philadelphia, Pa., assignors to The Brown Instrument Company, Philadelphia, Pa., a corporation of Pennsylvania Application July 18, 1935, Serial No. 32,028

69 Claims. (Cl. 236—82)

The general object of the present invention is to provide improved control apparatus of the type comprising an element deflecting in accordance with changes in the value of a controlling quantity or condition, means through which the deflection of said element from a predetermined, or normal value, position of the element varies an air or other control force, and means through which the variation in the control force thus produced, modifies the action of said element on the first mentioned means so as to effect suitable corrective variations in the control force on a departure of the latter from its predetermined or normal value, without creating an objectionable tendency to unstable control, or hunting.

More specific objects of the invention are to provide improvements in air actuated controllers of the type devised by us and forming the subject matter of our prior application No. 693,388, filed October 12, 1933. The controller disclosed in said prior application comprises an air space, valve means regulating a control pressure maintained in said space, a device for effecting an adjustment of said valve means on a change in a control condition to which said device is responsive, to thereby vary the pressure in said space, and a mechanism which is responsive to changes in said pressure and is actuated on an initial change therein produced by the adjustment of said valve means by said device to give said valve means a second, or follow up, adjustment tending to a reverse change in said pressure, and thereafter a third, or compensating adjustment in the direction to eliminate said second adjustment.

For the maintenance of the desired pressure in said space, the latter is provided with an inlet port through which said space receives air under suitable pressure and an outlet port through which air may escape from said space, and the said valve means may comprise a valve seat member in which one of said ports is formed and a valve member moved relative to the valve seat member, on the adjustment of said valve means, to thereby variably throttle the last mentioned port.

Our improved controller, disclosed and claimed herein, comprises mechanism through which the effect of a pressure change in the said air space resulting from an adjustment of the valve means by the device responsive to the control condition, controls the timing and in some cases the magnitudes of the resultant second and third adjustments relative to each other, and/or in respect to the relation of each to the valve means adjustment effected by said device on a change in said condition.

Air actuated controllers embodying the features of our present invention and of our said prior application, may take widely different forms, and are adapted for use for many different purposes. In general, they may be used wherever it is desirable to produce a control effect in response to a change in control condition or quantity, such, for example, as a temperature, a pressure or a velocity, which may or may not vary, or tend to vary, as a result of the control effect produced. In general, however, the relative magnitudes and timing of the second and third adjustments resulting from the change in the control pressure effected by, and following a change in the control pressure produced by an initial adjustment of the valve means by the device responsive to the control quantity, will depend on the character of the control system and the operating conditions. When, as in the control of the heat supplied to a furnace in response to a furnace temperature or heating effect, the response of the control quantity to a corrective adjustment in the pressure fuel supply, is delayed as a result of the so-called furnace lag, or in any control system in which the effect of a change in the control quantity is delayed by inertia, so to speak, of the apparatus controlled, variation in the relative magnitudes and timing of the different adjustments of a cycle of adjustments for which we make provisions, must be made to insure optimum control results, so as to make proper allowance for furnace lag or analogous inertia characteristic of the controlled apparatus.

For use in furnace control, and for many other purposes, it is ordinarily desirable to provide for adjustment of the control apparatus so that it tends to maintain a predetermined normal value of the controlling quantity or condition which value may vary from time to time, and our present invention comprises improved means for the adjustment of the normal value of a control quantity which it tends to maintain.

The various features of novelty which characterize our invention are pointed out with particularity in the claims annexed to and forming a part of this specification. For a better understanding of the invention, however, and the advantages possessed by it, reference should be had to the accompanying drawings and descriptive matter in which we have illustrated and described a preferred embodiment of the invention.

Of the drawings:

Fig. 3 is a diagrammatic representation of a control system including the instrument shown in Figs. 1 and 2;

Fig. 4 is a rear elevation partly in section, of parts shown on smaller scale in Fig. 3;

Fig. 5 is a front elevation, on a larger scale than Fig. 1, of a portion of the instrument shown in Fig. 1;

Fig. 6 is a side elevation, of parts shown in Fig. 5;

Fig. 18 is a side elevation of a portion of still another form of control instrument;

Fig. 19 is a partial elevation taken at right angles to Fig. 18; and

Fig. 19A is a modification of a detail of our invention.

The particular form of control system diagrammatically shown by way of example in Fig. 3, is adapted to adjust a fuel supply valve or other controller $a$, to thereby regulate the supply of heat to a furnace A as required to maintain an approximately constant furnace temperature which is measured by an expansion fluid thermometer of which B is the temperature responsive bulb or chamber. The fluid pressure in chamber B, which increases and decreases as the furnace temperature rises and falls, is transmitted by a conduit $b$ to a pressure responsive element C, shown as a Bourdon tube of helical form having its stationary end connected to the conduit $b$, and having its movable end secured to an arm C', which is pivoted to turn about an axis $C^2$, clockwise or counter-clockwise, as the pressure in the tube rises or falls.

Through suitable connections, the oscillations of the arm C' give motion to the valve $d$, which as shown, forms a part of a control pressure regulator or air controller unit or device D, and regulates the escape of air from, and thereby regulates the control air pressure in the regulator chamber D'. The latter receives air through a pipe E, a coupling EA and pipe EB from air supply means, which as shown, comprises a chamber F receiving air under pressure through a supply pipe G, and comprises means for maintaining a substantially constant pressure in the chamber, somewhat smaller than the pressure in the pipe G, notwithstanding fluctuations in the last mentioned pressure. The flow through the pipe E into the pipe EB is restricted, as by means of restricted port E', in the coupling EA between the pipes, so that the pressure in the pipe EB may normally be the same as that in the chamber D', and below that in the chamber F.

The variable air pressure maintained in the chamber D' is transmitted through a pipe EC in free communication through the coupling EA, with the pipe EB, to the pressure regulator diaphragm chamber H' of a fluid pressure relay device having a main pressure chamber H. The latter receives air under pressure through the passage FH from a suitable source shown as the chamber F, and means are provided for maintaining a pressure in the chamber H which varies with the pressure in the diaphragm chamber H' and hence with the control pressure in the regulator chamber D'. The means shown for the purpose comprises a valve member $h'$, actuated by the flexible diaphragm $h$ between chambers H and H', which throttles the air inlet through inlet FH more or less, and the outlet of air from chamber H through a vent $H^2$, less or more, as the pressure in the chamber H rises above or falls below the pressure in the chamber H'. The pressure in the chamber H is transmitted by a conduit Ha to the pressure chamber $a'$ of the valve $a$, which is a fluid pressure valve opening and closing to increase or decrease the fuel supply to the furnace A through a fuel supply pipe A' as the control pressure in the regulator D rises and falls.

Figure 1:
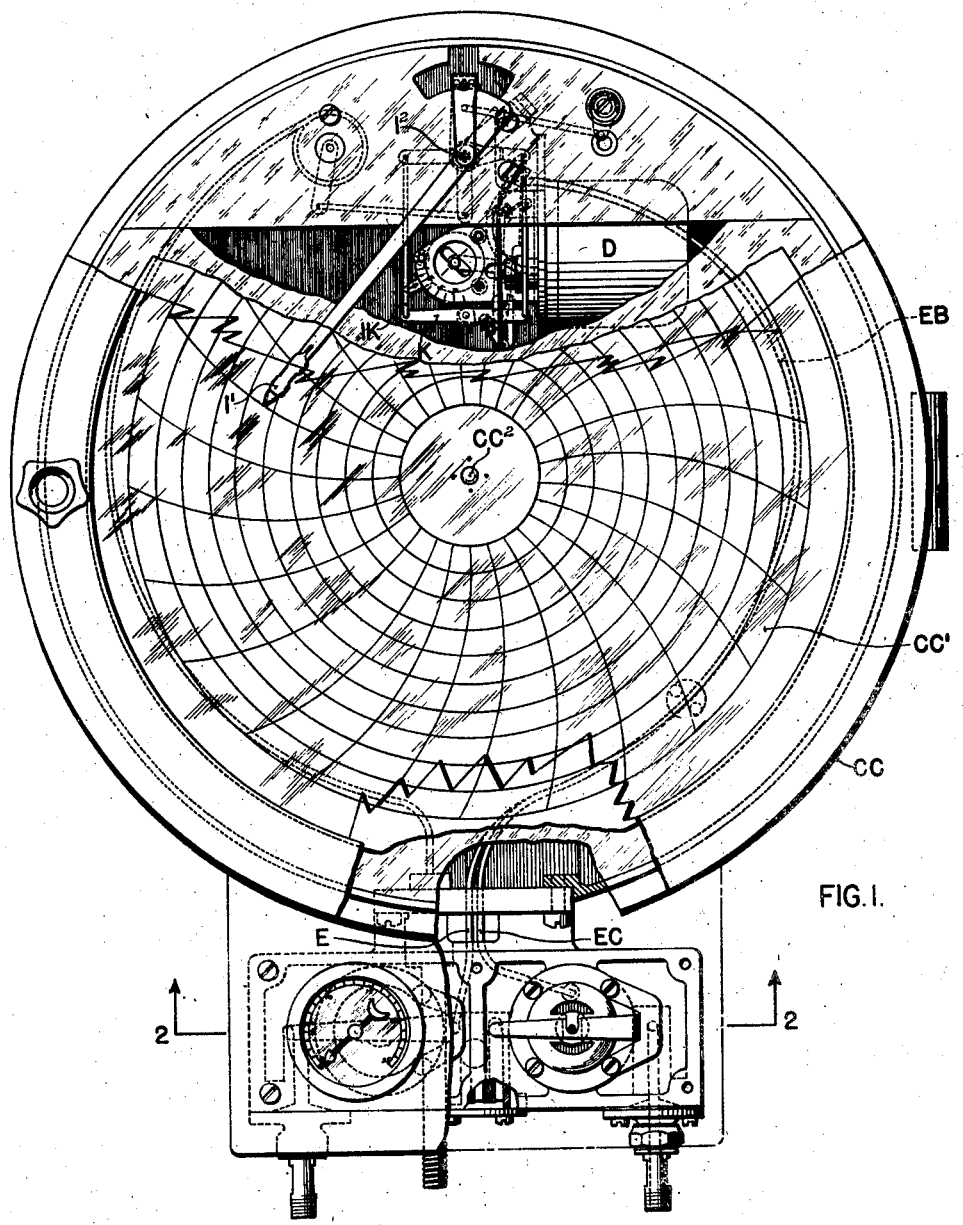
Fig. 1 is a front elevation of a control instrument with parts broken away and in section.
Figure 2:
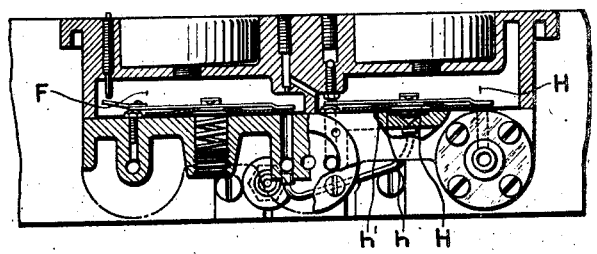
Fig. 2 is a partial section on the line 2—2 of Fig. 1.

All of the above mentioned parts except the furnace A, valve $a$, and bulb B may advantageously be combined in a single control instrument, and are so shown in Figs. 1 and 2.

The present invention is concerned with and consists in various mechanisms and methods by which a valve member, such as the above mentioned valve member $d$, is adjusted by, and as a result of, movements of a member, such as the above mentioned arm C', in response to changes in the value of the control quantity, which in the arrangement shown in Fig. 1, is the furnace temperature to which the thermocouple B responds.

In the form of the invention illustrated in Figs. 1-6, movements of the arm C' give movements to the valve $d$ through a link CI, a rocking element I, a floating lever K, a link IK connecting parts I and K, and a bell crank lever M connected by pivot M' to the lever K, and carrying a pin $M^3$ engaging the valve $d$. The value of the control quantity which the apparatus tends to maintain may be manually adjusted as conditions make desirable, by a rocking element J connected to the lever K by a link JK. The latter in effect, forms an adjustable fulcrum for the lever K, and mechanism hereinafter described, adjusts the lever M relative to the lever K to modify the action of the latter on the valve $d$, in response to variations in pressure conditions within the device D, resulting from changes in the position of the valve $d$.

The rocking element I is mounted to oscillate about the axis of a shaft $I^2$, and carries a pointer I' which may indicate the value of the control quantity on a suitable scale and in the instrument CC, as shown in Fig. 1, carries a pen point or stylus at its free end which is adapted to make a record on a chart disc $CC^1$. The latter is rotated by the constantly rotating chart shaft $CC^2$, and is provided with scale lines. As shown, the rocking element I includes an arm $I^3$ to which the corresponding end of the link CI is connected, and a second arm $I^4$ to which the corresponding end of the link IK is connected.

The rocking element J is mounted to oscillate about the axis of the shaft $I^2$ and includes an index arm $J'$ which indicates on the same scale with which the pointer $I'$ cooperates, the normal value of the control quantity. When the control quantity is at its normal value, the pointer $I'$ will be directly in front of, and will register on the scale with the index $J'$. As shown in Fig. 3, the position of the pointer $I'$ corresponds to an actual value of the control quantity greater than the normal value. The element J includes an arm $J^2$ to which the corresponding end of the link JK is connected. In the valve operating means shown in Figs. 1, 3, and 5, the floating lever K is suspended from the arms $I^4$ and $J^2$ by members IK and JK, which engage the lever K at spaced apart points and constitute substantially vertical suspension links through which the lever is suspended. In consequence, gravitational forces are utilized in eliminating lost motion in effecting an adjustment of the lever K through either of said links by angular adjustment of the corresponding elements I or J. As previously explained, the element I is given angular adjustments in accordance with changes in the value of the control quantity acting through the parts C, C' and CI. The rocking element J may be manually adjusted about the axis of the shaft $I^2$ to increase or decrease the normal value indicated by the index $J'$, and to simultaneously and correspondingly raise or lower the fulcrum for the lever K formed by the lower end of the link JK, by an adjusting element $J^3$ having an arm $J^4$ connected by a link $J^5$ to the element J. As shown, the adjusting element $J^3$ is in the form of a rotatable element which may be normally held stationary by frictional means, and is provided with a kerf $J^6$ for engagement by a screw driver by which the element $J^4$ may be angularly adjusted to thereby angularly adjust the element J, when adjustment in the normal value of the control quantity is desirable.

The device D as shown, comprises a cup shaped casing element detachably connected at its open end to a head $D^2$. The latter is formed with an aperture through which the air supply pipe EB communicates with the space $D^1$, and with an aperture in which is mounted the bleeder or vent nozzle $D^3$ through which air escapes to the atmosphere from the chamber $D'$ at a rate depending on the adjustment of the valve member $d$. Preferably and as shown, the nozzle member $D^3$ has an external globular end surface surrounding the outer end of the nozzle passage $D^{30}$, and the valve member $d$ is a piece of sheet metal extending transverse to the length of, and movable toward and away from the outer end of the nozzle passage. As shown, the valve $d$ is pivoted to turn about a shaft $d'$ which may be mounted on the head $D^2$. A spring $d^2$ gives the valve $d$ a slight bias toward its closed position, in which it engages the nozzle member $D^3$ at the margin of the nozzle passage $D^{30}$.

A resilient bellows element $D^4$ located within, but not filling the casing of the device D, has one end secured to the end head $D^2$, and has its other end closed so that an increase or decrease in the pressure within the space $D^1$ between the casing of the device D and the bellows $D^4$, tends to contract and expand the latter. Within the bellows $D^4$ and separated from the latter by an inter-bellows space $D^5$, is a smaller bellows element $D^6$ which has one end secured to the end head $D^2$ at the margin of an opening $D^7$ in the latter, through which the interior of the bellows $D^6$ is in free communication with the atmosphere at all times. The inter-bellows space $D^5$ communicates with the atmosphere through a restricted passage $D^8$ formed in the end head. Advantageously, an adjustable obturator $D^{80}$ is provided to regulate the flow capacity of the passage $D^8$.

The movements of the free end $D^9$ of the bellows $D^6$ modify the operating effect of the lever K on the valve $d$, through parts which are shown best in Figs. 3-6, and comprise a link DO connecting the bellows head $D^9$ to a lever O mounted to oscillate about the shaft $d'$ and pivotally connected by a pivot shaft $O'$ to a lever L. The latter is connected by a pivot shaft $M^2$ to the lever M, and has an adjustable fulcrum formed by a pivot pin $L'$ carried by the lever L and slidingly received in a diametral slot $N'$ formed in an angularly adjustable disc N.

The link DO which is axially disposed in the bellows $D^6$, and may be rigidly secured to the end head $D^9$ of the latter, is preferably connected to the lever O for adjustment relative to the latter, in such manner as to vary the effective length of the link. As shown, the lever O is a trough shaped piece of sheet metal having side portions transverse to and formed with journal apertures through which the shaft $d'$ extends, and having a bottom wall generally parallel to the end head $D^2$, and between the latter and the shaft $d'$. The link DO extends through a bottom wall opening in the lever O, and is hooked or looped about a pivot pin $O^2$ carried between the legs of a yoke portion $O^3$ of a sheet metal part $O^4$ secured to the bottom wall of the lever O at a distance from the link DO. A threaded adjusting device $O^5$ acts between the part $O^4$ and the bottom wall of the lever O adjacent its connection to the link DO, to bend the corresponding portion of the member $O^4$ farther away from, or to allow it to approach closer to the bottom wall of the member O, and thereby move the pivot pin $O^2$ relative to the lever O in the direction of the length of the link DO. The pivot shaft $O'$ has its ends mounted in the sides of the trough shaped lever member O.

As shown, the lever L comprises opposite side portions between, and respectively adjacent the opposite side portions of the lever O, and a cross bar connecting portion $L^2$. An uprising arm portion of the side portion of the lever L adjacent the disc N, carries the pin $L'$ which works in the slot $N'$, so that the lever L forms in effect a bell crank lever, with the plane of its pivotal connections $O'$ and $M^2$ at one side of the pivot pin $L'$. The pivot shaft $M^2$ passes through the side portions of the lever L.

Counterclockwise movement of the lever M about its pivot $M^2$, as seen in Fig. 4, gives an opening movement to the flapper valve $d$ through the action on the latter of the pin $M^3$ carried by the lever M. The pin $M^3$ is advantageously connected to the lever M for movement toward and away from the pivot $M^2$ to thereby vary the extent of valve movement produced by a given angular movement of the lever M. For the purposes of this adjustment, the pin $M^3$ is mounted in, and extends through a link $M^4$ which is formed with a longitudinal slot for the passage of a screw $M^5$ for clamping the link $M^4$ to the lever M with the pin $M^3$ at different distances from the clamping screw $M^5$. As the effective length of the link $M^4$ is thus varied, the pin $M^3$ moves toward or away from the pivot $M^2$ in a slot $M^6$ in the lever M extending radially from the pivot $M^2$. To adapt the apparatus for use under conditions in which a clockwise movement of the lever M, as seen in Fig. 4, should give an opening adjustment to the valve, the lever M is formed with a second slot $M^7$ generally in alignment with the slot $M^6$, but at the opposite side of the pivot $M^2$, and adapted to form a slideway for the pin $M^3$ when the link $M^4$ is suitably positioned for that purpose.

The member N is supported by a bracket $D^{10}$ mounted on the end head $D^2$, and extending transversely to the latter and formed with an aperture $D^{11}$ coaxial with the disc N. The latter is adjustably held against the bracket $D^{10}$ by two angularly displaced clip parts $N^2$ shown as bolts threaded into the bracket and having cylindrical body portions engaged by the edge of the disc, and head portions which overlap the outer portion of the disc, and by a third clip part $N^3$ comprising a bolt or pin attached at one end to the bracket $D^{10}$ and a sliding collar $N^4$ pressed by a spring $N^5$ toward the bracket. The head $N^4$ is formed with a conical surface which bears against the edge of the disc N. The clip parts $N^2$ and $N^3$ thus collectively provide a bearing for the disc N, in which the latter may be angularly adjusted by means of an extension arm $N^6$. The latter as shown, is provided with an index line cooperating with a scale $D^{12}$ on the bracket $D^{10}$ to indicate the angular adjustment or direction of inclination of the slot N', in which the pin L' of lever L is received. The spring pressed part $N^3$ insures the frictional holding of the disc N in any angular position into which it may be adjusted.

Each of the bellows elements $D^4$ and $D^6$ has longitudinal resilience and, consequently, a definite length when the pressures acting on its inner and outer walls are the same. When the external pressure on either bellows is less than, or exceeds the pressure within the bellows, the bellows will elongate or contract as required to make the differential of the effects of those pressures on the bellows equal to the opposing resilient bellows force resulting from the elongation or contraction of the bellows, that force, of itself, always tending to return the bellows to its normal or unstressed length.

On an increase in the pressure within the Bourdon tube C and consequent movement of the link IK upward as seen in Fig. 3, the lever M acts on the valve $d$ to move the latter away from the nozzle $D^3$ and thereby reduce the pressure in chamber D'. The pressure reduction in chamber D' elongates the bellows $D^4$, and thereby enlarges the interbellows space $D^5$ and reduces the pressure in the latter, owing to the relatively slow inflow of air permitted by the restricted passage $D^8$. The reduction of the pressure in the space $D^5$ elongates the bellows $D^6$ and thereby moves the link DO to the right as seen in Fig. 3. The movement thus given the lever O, moves the parts L, M, and K toward the right as seen in Fig. 3, and thereby permits of a return movement of the valve $d$ toward the nozzle $D^3$, partially neutralizing the effect of its initial movement away from the nozzle.

The extent of such return movement of the valve $d$ produced by a given movement of the link DO, depends, with the arrangement shown in Figs. 1-6, upon the relation of the movement of the pivotal connection $M^2$ to the movement of the pivotal connection O', and that relation is dependent upon the inclination of the slot N' in the member N. With the slot N' inclined generally as shown in Fig. 3, a counter-clockwise turning movement of the lever O about the shaft d' will produce a clockwise or counter-clockwise movement of the lever L about the pivotal connection O' accordingly, as the direction of the length of the slot N diverges counter-clockwise or clockwise, respectively, from the direction of the plane including the axes of the shaft O' and pin L'. With the adjustment of the disc N such that the counter-clockwise movement of the lever causes the lever L to turn clockwise about the shaft O', the angular movement of the pivot $M^2$ about the shaft d' will be less than the angular movement about the latter of the lever O.

The enlargement of the interbellows space or chamber $D^5$ reduces the pressure therein and thereby creates an inflow of air into $D^5$ through the passage $D^8$, which tends to slowly restore the pressure in the chamber $D^5$ to its normal equality with the pressure of the atmosphere. As the pressure in the chamber $D^5$ builds up, the bellows $D^6$ shortens and thereby again moves the valve $d$ away from the nozzle $D^3$ and back toward the position into which it was moved on the original change in position of the link IK, provided the latter has not been moved in the direction of its length in the meantime as a result of a change in the Bourdon tube pressure. The converse of the actions just described occur on a decrease in the pressure in the Bourdon tube C, and a corresponding adjustment of the link IK downward as seen in Fig. 3.

In the normal and intended use of the apparatus shown in Figs. 1-6, the proportions and adjustments of the parts are such that upon an increase or decrease in furnace load of usual magnitude requiring some increase or decrease in the rate of fuel supply to maintain the desired furnace temperature, the initial resultant decrease or increase in the furnace temperature will tend to produce a movement to its limit, of the valve controlling the rate of fuel supply, in the direction to return the control temperature to its normal value, which will therefore be of such magnitude that the new rate of fuel supply will be greater or less, respectively, than that required to maintain the normal control temperature with the new furnace load. Such a control operation of itself, is essentially unstable, and must result in hunting. The control action described is modified, and the hunting tendency eliminated or minimized by the initial movement of the link DO, which effects what is commonly called a follow-up adjustment. The latter can be made sufficient to insure a control which is stable and not hunting. In such case, however, the follow-up adjustment, if not later neutralized, will result in the maintenance of a furnace temperature necessarily, and significantly lower with a heavy furnace load than with a lighter furnace load.

The control adjustment resulting from the second or return movement of the link DO, occurring as the pressure in the interbellows space $D^5$ approaches its normal atmospheric value, following a departure from that value, is a compensating adjustment which may be made to neutralize the effect of the follow-up adjustment slowly enough to substantially eliminate the effect of the follow-up adjustment on the control temperature when the load is steady, without giving rise to an objectionable hunting tendency.

With the apparatus shown in Figs. 1–6, a heavy furnace load requires the combustion of more fuel, and hence a higher pressure in the valve chamber $a'$, than are required by a lighter load. In consequence, with stable operation it is theoretically necessary that the valve $d$ be closer to its seat with a heavy load than with a light load. Moreover, it is theoretically impossible to maintain the control temperature precisely at the predetermined value with heavy and with light loads, unless the relation of nozzle $D^3$ and valve $d$ is adjusted with each change of load. In practice, the distance between heavy and light load positions of the valve $d$ required for stable operation, is so small as to be without significant effect on the ordinary operation of the control apparatus, and to correspond to a departure of the control temperature normal value so small as ordinarily to be of no significance, but I may completely eliminate the necessity for such variation of the nozzle $D^3$ and valve $d$ by providing a servo nozzle as shown in Fig. 5. The servo nozzle of Fig. 5 comprises a thin metal shell the cylindrical portion $D^{30}$ of which is rigidly attached to end wall $D^2$ and the interior of which is in free communication with space $D^1$. The flexible outer wall $D^{31}$ of the shell is adapted to expand and contract as a result of increase or decrease in pressure within the shell and accordingly within space $D^1$. Aperture $D^{32}$ in end wall $D^{31}$ is the actual port which is variably throttled by valve $d$ and it will be clear that with the proper proportioning of the size and thickness of the end wall, the latter may move toward or away from the nozzle to compensate for the change in relationship of the valve $d$ and nozzle $D^3$ referred to above.

With the apparatus of Figs. 1–6, on any significant departure of the control temperature from its predetermined normal value, ordinarily the initial adjustment given the valve $d$ by the link IK, should be sufficient, if the valve adjustment were maintained, to vary the pressure in the chamber $D'$ to the corresponding limit, which is a pressure approximately equal to the pressure of the atmosphere when the control temperature is above normal, and is approximately equal to the pressure in the pipe E when the control temperature is below normal. Ordinarily, also, the resultant follow-up adjustment effected as the bellows $D^6$ elongates or contracts, should be rapid, so that the pressure change in $D'$ will be arrested and reversed long before the corresponding limit of change in that pressure is reached. Ordinarily, also, the corrective effect of the initial adjustment kick or change in the pressure in $D'$, should be great enough so that for any usual and expected change in furnace load, the trend of the control temperature away from normal will be reversed during, or prior to an initial portion of the compensating adjustment following the initial adjustment of the valve $d$. If said trend is not so reversed, the pressure in $D'$ will change further in the original direction, as the compensating adjustment proceeds, and thereby prolong the compensating adjustment until the control temperature trend is reversed, or the pressure in $D'$ reaches its corresponding limit. The variation in the pressure in $D'$ will not extend to either limit wihout reversing the control temperature trend, unless furnace or load conditions require a corrective control effect beyond the operative capacity or range of the control apparatus.

The magnitude of the follow-up adjustment and time interval in which it is effected, which will give the optimum results in any particular control system, will depend on the character of that system and operating conditions. In particular, in furnace control it will depend largely on the so-called "time lag" of the furnace, or rate of response of the furnace temperature to a corrective change in the rate of fuel supply.

In general, also, for optimum results account needs to be taken of the normal and to be expected magnitude, frequency, and duration of the changes in furnace load, or other conditions affecting the control quantity, since the particular magnitude and timing of control actions which will give the best results with one character of change in furnace load or other controlling condition, may not give the best result when those changes are of a different character. Ordinarily, therefore, optimum results are those which are best adapted to cope with some assumed average or usual character of changes in a primary controlling condition.

It should be borne in mind that such a control system as that shown in Figs. 1–6, must cope not merely with individual more or less transient changes in furnace load, but with conditions which exist when one change in furnace load is followed by further furnace load changes in the same direction or in the opposite direction, before the control actions started by and effective to correct for the original change have been completed, so that a new follow-up adjustment is instituted before the previous follow-up adjustment or subsequent compensating return adjustment is completed. The conditions just mentioned are not peculiar to furnace control, but exist in any control system in which the primary control condition fluctuates in a variable manner.

The arrangement shown in Figs. 1–6 permits of a substantial over correction of the controlled quantity during the time of a departure from normal of the control quantity, which may be varied by varying the inclination of the slot N' in the member N to thereby vary the magnitude of the follow-up adjustment, and includes other provisions for varying the time intervals required to eliminate the follow-up adjustments. Other forms of the invention hereinafter described include other features of which no use is made in the apparatus shown in Figs. 1–6. The apparatus in the form of Figs. 1–6 was designed for producing a corrective effect whereby in a temperature installation, for example, the rate of fuel flow is adjusted to different values in proportion to the extent of temperature departure from normal, the rate of change of this rate of flow or the rate of valve adjustment, is proportional to the rate of temperature change, and the rate of fuel flow is adjusted slowly in proportion to the extent and duration of the temperature departure from normal.

It is frequently desirable to make a greater change in the corrective agent, as for example in a temperature installation, a greater change in the rate of flow of fuel, than provided for in the mechanism of Figs. 1–6. Such greater change is especially desirable during the early stage of a departure from normal, in order to quickly check the undesirable trend and to quickly supply the deficiency of fuel resulting from the change in demand which caused the departure. Such a surplus correction may be made during the first stage of a departure from normal with advantageous results, if it is of the proper magnitude and duration to suit the particular process under control and the latter requires that the correction be removed before resulting in an over correction which would cause hunting. In the mechanism hereinafter described provisions are made for adjustably controlling the application of such greater change in the corrective agent upon a departure from normal of the controlled condition.

We preferably cause the greater initial change by delaying the follow-up movement which, in the normal operation of the mechanism of Figs. 1-6, tends to prevent large corrective action. In the arrangement shown in Figs. 7-9, the follow-up adjustment of the flapper valve, occurring as a result of an initial change in the control quantity, may be variably delayed and varied in magnitude by means of an adjustable lost motion connection between the follow-up link DO and the flapper or control valve. Such delay effects periods during which the full effect of the tendency toward large valve adjustments is permitted.

The apparatus shown in Figs. 7-9 may be identical with that shown in Figs. 1-6, except as hereinafter noted in respect to the provisions through which the lever K and follow-up link DO cooperate to control the position of the flapper valve $da$, generally like, and replacing the flapper valve $d$ previously described.

Figure 7:
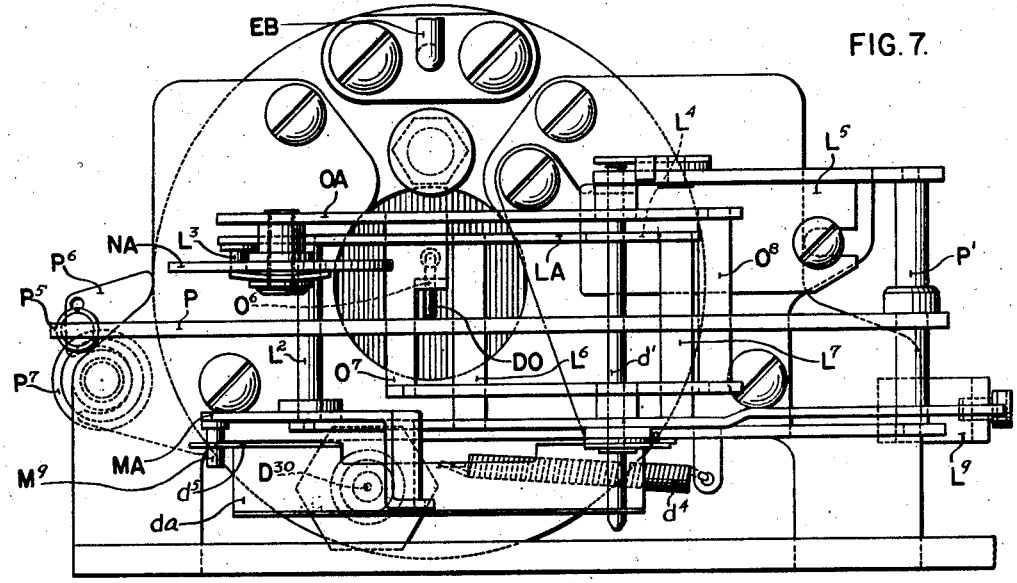
Fig. 7 is a side elevation of a second form of control instrument.
Figure 8:
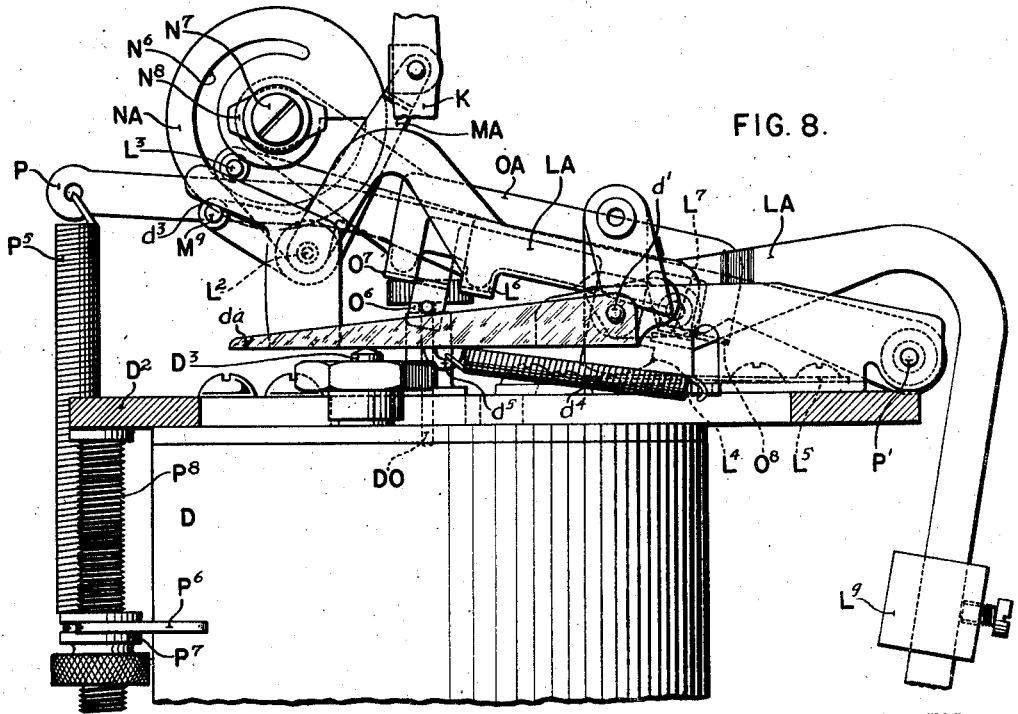
Fig. 8 is an elevation partly in section and taken at right angles to Fig. 7.
Figure 9:
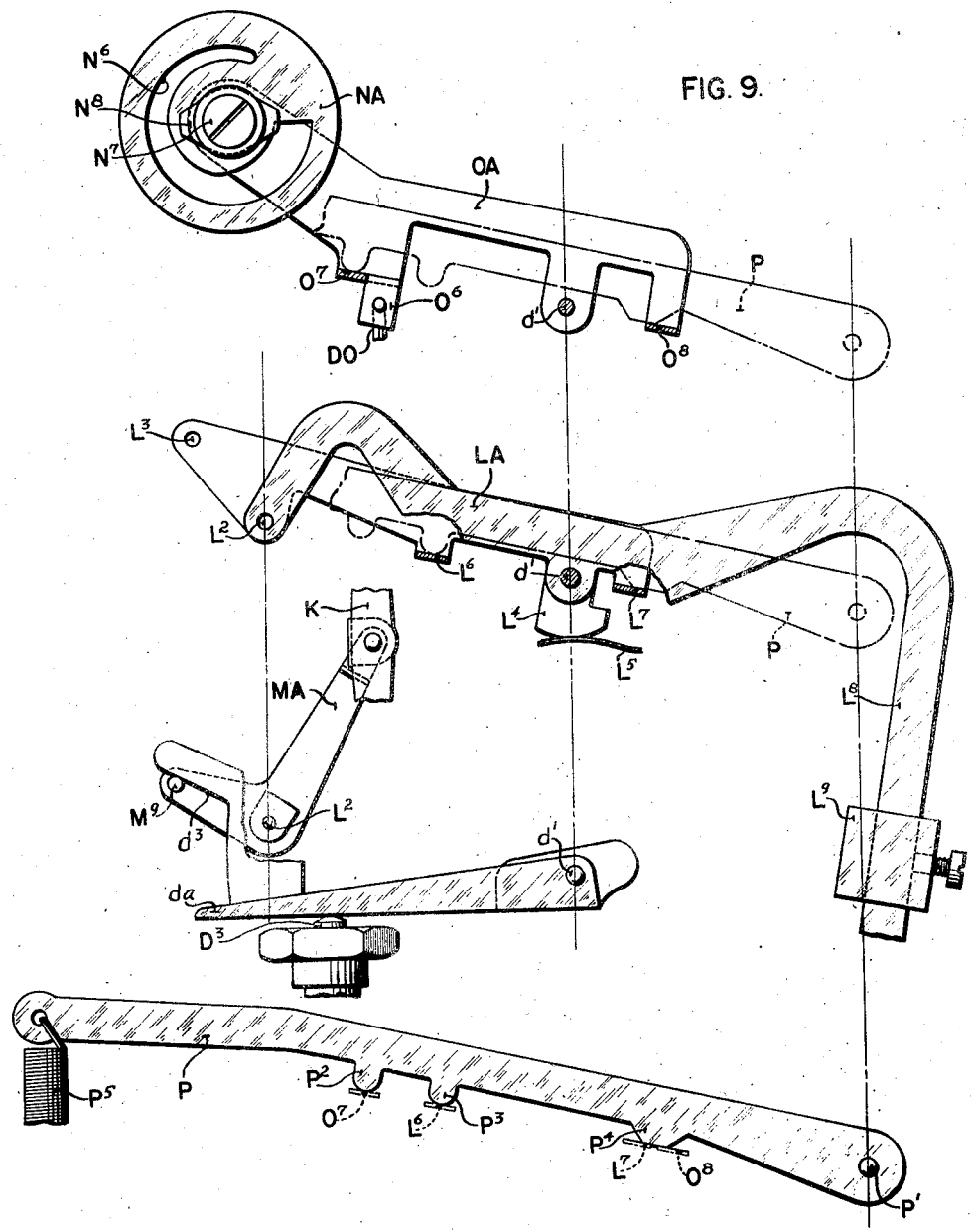
Fig. 9 is a diagrammatic representation of parts shown of Figs. 7 and 8 and relatively displaced to better show their construction and arrangement.

In the arrangement shown in Figs. 7-9, the follow-up action link DO is connected at its upper end to an extension $O^6$ of a lever OA journalled on the shaft $d'$ on which the flapper valve $da$ is journalled. At a distance from a shaft $d'$, the lever OA carries a follow-up adjustment device NA, in the form of a disc formed with a slot $N^6$, the center line of which extends circularly about the axis of a pivotal connection between the disc NA and the lever OA. Said axis is parallel to the shaft $d'$, and said slot $N^6$ progressively increases in radial depth from one end to the other. The disc NA is pivotally connected to the lever OA by a screw $N^7$ passing through the disc NA and threaded into the lever OA, with a friction washer $N^8$ between the head of the screw and the disc NA, so that the latter may be frictionally held in any angular position into which it is adjusted. The disc NA and a pin $L^3$ carried by the lever LA and extending through the slot $N^6$ in said disc, provide an adjustable lost motion connection between the lever OA and the lever LA. The lever LA is pivoted on the shaft $d'$, and is yieldingly held in any angular position into which it is adjusted, by means of its extension $L^4$ having a surface extending circularly about the axis of the shaft $d'$, and engaged by a friction spring $L^5$ secured to the head $D^2$ of the unit D. The lever LA supports a pivot shaft $L^2$ which is adjacent the pin $L^3$, and between the latter and the shaft $d'$, and parallel to the latter. On the pivot shaft $L^2$ is journalled a bell crank lever MA, corresponding generally to the lever M of the construction first described, the lever K being connected to one arm of the lever MA, while the other arm of the lever MA carries a pin $M^9$ through which the flapper valve $da$ may be moved in the opening direction and through which its movement in the opposite direction is controlled. As shown, the pin $M^9$ engages a surface $d^3$ carried by an arm or extension of the valve $da$, and inclined to the plane which passes through the axis of the shaft $d'$ and is tangential to the flapper valve seat at the outer end of the nozzle member $D^3$. The valve member $da$ is biased toward its closed position by a spring $d^4$, connected at one end to an extension $d^5$ from the flapper valve, and connected at its other end to the head $D^2$.

With the parts of the arrangement shown in Figs. 7-9 already described, on any change in the value of the quantity measured, the link IK acts through the levers K and MA to produce a corresponding adjustment of the flapper valve $da$, generally, as a similar quantity change produces analogous flapper valve movements, through the lever K, and lever M of the arrangement of Figs. 1-6. In the arrangement of Figs. 7-9, also, any movement of the follow up link DO produces a corresponding movement of the lever OA about the shaft $d'$.

The movement of the lever OA produced by the link DO is without effect on the flapper valve position, however, unless and until its extent is sufficient to bring one edge or the other of the slot $N^6$ into engagement with the pin $L^3$. Thereafter if the movement of the lever OA continues, the lever LA is similarly moved, with a resultant change in the position of the pivot shaft $L^2$ on which the lever MA is journalled, and such adjustment of the lever MA has the same effect on the position and operation of the flapper valve $da$, as the adjustment of the lever M produced by the lever O has on the valve $d$ of Figs. 1-6. The extent of the lost motion between the levers LA and OA permitted depends upon the radial extent of the portion of the slot $N^6$ in which the pin $L^3$ is located, and may be varied by angular adjustment of the disc NA. The effect of said lost motion is to delay, and to minimize the extent of, the effect on the position of the flapper valve $da$, produced by a given movement of the link OD.

Advantageously, and as shown, the arrangement of Figs. 7-9, includes bias means tending to hold the lever OA in a predetermined normal angular position, and to hold the lever LA in a corresponding normal angular position, in which the axis of the pin $L^3$ intersects the center line of the tapered slot $N^6$. The bias means shown, comprises a lever P turning above a pivot shaft P' which is mounted on the head $D^2$ and parallel to the shaft $d'$. A spring $P^5$ tends to move the lever P' into a normal position of the latter, in which it engages portions $O^7$ and $O^8$ of the lever OA at opposite sides of the shaft $d'$, and engages portions $L^6$ and $L^7$ of the lever LA at the opposite sides of the shaft $d'$, and thus holds each of the levers OA and LA in a corresponding normal position. As shown, the lever P is formed at its edge adjacent the head $D^2$ with projections $P^2$, $P^3$, and $P^4$. In the normal positions of the levers OA, LA and P, the projection $P^2$ engages the portion $O^7$ of the lever OA, and the projection $P^3$ engages the portion $L^6$ of the lever LA, and the projection $P^4$ engages both the portion $O^8$ of the lever OA, and the portion $L^7$ of the lever LA.

As will be apparent, turning movement of the lever OA under the action of the link DO in either direction, will turn the lever P clockwise as seen in Fig. 9, against the action of the spring $P^5$. To avoid gravitational effects, the lever LA is advantageously provided with an arm $L^8$ carrying a counterweight $L^9$, which may be adjusted as required to balance the gravitational forces acting on lever LA, including any thrust on the lever by the lever MA. The tension of the spring $P^5$ may be varied by adjustment of the normally stationary abutment, $P^6$ to which the end of the spring remote from the lever P is connected. As shown, the abutment $P^6$ may be adjusted through a supporting nut $P^7$ threaded on a screw $P^8$ secured to the head $D^2$, and generally parallel to the spring $P^5$.

The return of the levers OA and LA to their normal positions by the lever P at the end of any one adjusting operation or cycle, insures the desired extent of lost motion between the levers LA and OA on the initial movement of the latter in either direction from its normal position at the beginning of a following control operation or cycle. The action of the return to normal lever P with its loading spring $P^5$, on the lever OA, also modifies the extent and time required for each follow up adjustment and for each compensating adjustment. The spring $P^5$ prevents the bellows $D^6$ from contracting or elongating, as a result of a difference between the pressures acting on its inner and outer sides, except when that pressure differential is large enough to overbalance the effect on the bellows of the spring $P^5$.

In consequence, when the pressure in the interbellows space $D^5$ rises above atmospheric pressure, the bellows $D^6$ will not begin to contract until the rise is sufficient to overbalance the action on the bellows of the spring $P^5$.

Conversely, the pressure in $D^5$ must fall below the pressure of the atmosphere by a predetermined amount, before the action of the spring $P^5$ will permit the bellows $D^6$ to elongate.

The return to normal lever P with its spring $P^5$, therefore retards the initiation of each follow up adjustment and hastens the completion of the subsequent compensating adjustment, and thus tends to shorten the period in which each such adjustment is effected. Moreover, the lever P with its loading spring reduces the extent of the movement given the free end of the bellows $D^6$ by any given change in the pressure in $D'$, and thereby not only reduces the magnitude of the follow up adjustment, but also the magnitude of the subsequent compensating adjustment.

In the arrangement shown in Figs. 7, 8, and 9 the levers P and OA coact as levers of the second and first classes, respectively. On an elongation of the bellows $D^6$, the lever P applies power to the projection $O^8$ carried by one arm of the lever OA. When the bellows $D^6$ contracts, the lever P acts on the projection carried by the second arm of the lever OA. If the length of the two lever arms of lever OA are in the same proportion as the distances from the fulcrum P' to the portions of the lever P, respectively engaging the parts $O^8$ and $O^7$ of the lever OA, the modifying effect of the lever P on the follow up and compensating adjustments will be the same, when the adjustments result from a contraction of the bellows $D^6$, as when they result from an elongation of that bellows, but this will not be the case with a different relation between the lengths of said lever arms and said distances.

With the arrangement shown in Figs. 7-9, the lost motion connection between the levers OA and LA, prevents the link DO from effecting any follow-up adjustment of the flapper valve $da$ during the time interval required for such movement of the link as is necessary to take up the lost motion. Moreover, the magnitude of the follow-up adjustment given the flapper valve is proportional, not to the full movement given the link DO but only to the portion of that movement occurring after the lost motion has been taken up so that one or the other of the curved edges of the slot $N^6$ is brought into engagement with the pin $L^3$ carried by the lever LA. The lost motion connection between the levers LA and OA also serves to permit any reverse change in the control quantity, resulting either from a change in furnace load or other primary control condition, or as a result of the corrective adjustment of the controlled quantity following the initial departure of the control quantity from its normal value, to produce an immediate direct effect on the adjustment of the flapper valve which is not minimized or retarded in any way by the provisions for effecting the follow-up adjustment.

Figure 10:
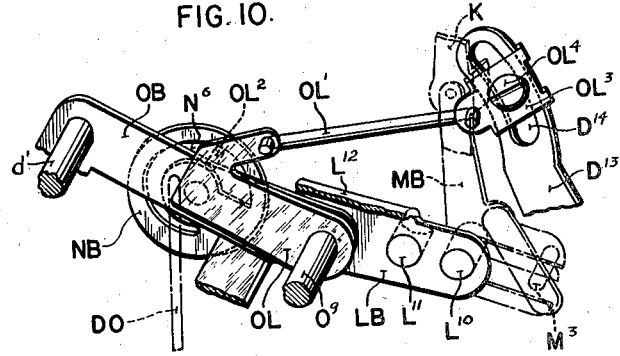
Fig. 10 is a perspective view of a portion of a third form of control instrument.
Figure 11:
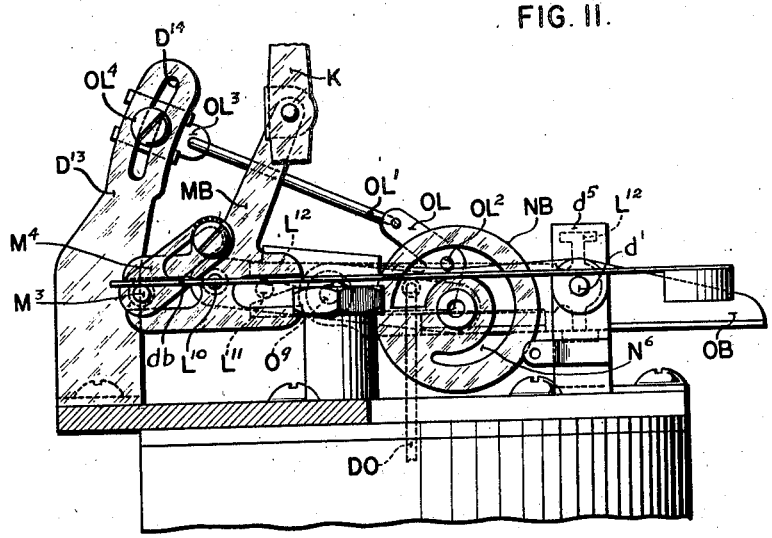
Fig. 11 is an elevation of a portion of an instrument including parts shown diagrammatically in Fig. 10.

The arrangement shown in Figs. 10 and 11 includes provisions, different from, and somewhat simpler than those shown in Figs. 7-9, for a lost motion connection between the follow-up link DO and the flapper valve, giving the same general effects of the lost motion connection of Figs. 7-9. The arrangement of Figs. 10 and 11 include nothing analogous in effect, or operative result, to the lever P of Figs. 7-9, however. In the mechanism of Figs. 10 and 11 are embodied, however, further provisions governing the removal of the initial effect produced by the lost motion connection. In the device of Figs. 7-9, the initial effect produced as a result of the lost motion connection will remain applied until the trend of the controlled condition reverses, because, as will be clear, the direction of the subsequent compensating movement of link DO, occurring as bellows $D^6$ returns to its normal free length, will be in a direction to maintain contact between pin $L^3$ and the side of slot $N^6$ with which the pin is then in engagement. Consequently the pin $L^3$ will not be urged in a direction to traverse slot $N^6$ until the member MA is turned in the opposite direction from its original rotation, as a result of the return of the controlled condition toward normal. It is sometimes desirable to remove the initial correction as soon as the trend of the condition away from normal is halted or has been checked. The apparatus of Figs. 10 and 11 is adapted to remove the initial effect as soon as the rate of departure of the condition from the control point falls below the rate of compensation or, for example, what would be the equivalent in Figs. 7-9, of the removal of the large initial effect when the rate of movement of member MA by lever K in one direction is less than the movement of member MA, in the same direction, by link DO as the pressure equalizes across restriction $D^8$. The latter action is desirable because such a condition indicates the trend of the departure has been checked, and the large initial effect if not removed would result in reversing the trend, and possibly cause an overswing in the opposite direction.

In Figs. 10 and 11, the follow-up link DO is connected and gives motion to a lever OB pivoted on the flapper valve supporting shaft $d'$. The free end of the lever OB supports a pivot shaft $O^9$ parallel to the shaft $d'$ and on which is journalled a lever LB carrying a pivot $L^{10}$ on which a lever MB is journalled. The latter is connected to the lever K and may be identical with the previously described lever MA but as shown, differs from the latter in that its flapper valve operating pin $M^3$ is adjustably connected to the lever MB as the pin $M^3$ is connected to the lever M in the construction shown in Figs. 1-6. At the opposite side of the pivot shaft $O^9$ from the pivot $L^{10}$, the lever LB has mounted on it an angularly adjustable slotted disc NB, which may be exactly like the disc NA mounted on the lever OA of Figs. 7-9.

The relative angular movement of the levers OB and LB about their connection pivot $O^9$ is controlled by another lever OL. The latter has one end journalled on the pivot $O^9$ and has its other end connected to a stationary abutment by a link OL', and intermediate its ends, the lever OL carries a pin $OL^2$ which works in the slot $N^6$ of the disc NB of Figs. 10 and 11, as the pin $L^3$ works in the slot of the disc NA. The abutment member $OL^3$ to which lever OL is connected by link OL' is adjustably clamped to an extension $D^{13}$ from the head $D^2$ by a clamping screw $OL^4$ passing through an arc shaped slot $D^{14}$ in the extension $D^{13}$. The abutment $OL^3$ is thus adjustable in the direction of the length of the slot $D^{14}$, which may be, and as shown, extends circularly about an axis approximately coincident with the axis of the pin $OL^2$ when the latter is in the center of slot $N^6$.

The lever LB carries another pin $L^{11}$ engaged by a flat spring $L^{12}$. The latter is pivoted on the flapper valve shaft $d'$, but is yieldingly held against movement about said shaft by its frictional engagement with a bracket $d^5$ in which the shaft $d'$ is journalled. The spring $L^{12}$ does not significantly oppose turning movement of the lever LB about the axis of pin $L^{11}$, but does oppose movement of that pin angularly about shaft $d'$. The pin $L^{11}$ is displaced from pivot $L^{10}$ so that movements of lever LB, independently of lever OB which are pivotal movements about pin $L^{11}$, result in rotation of pin $L^{10}$ about the axis of pin $L^{11}$ to thereby effect movement of the flapper valve when relative movements of the pivot shaft $O^9$ and $O^{11}$ are unrestrained. Such free relative movements of shaft $O^9$ and pin $L^{11}$ may occur only while the pin $OL^2$ is out of engagement with either edge of the slot $N^6$ in the disc NB.

In the operation of the mechanism just described, as that mechanism is seen in Fig. 11, on a clockwise adjustment of the lever MB produced by the lever K and giving an opening adjustment to the flapper valve $db$, the resultant downward follow-up movement of the link DO turns the lever OB counterclockwise about the shaft $d'$ and thereby lowers the pivot shaft $O^9$. Such movement of the pivot shaft $O^9$ causes the lever LB to turn clockwise about the axis of pin $L^{11}$ which turns pivot $L^{10}$ in the clockwise direction lifting flapper $db$ further from the nozzle thereby amplifying the original flapper movement. This movement will continue until the lowering of the disc NB brings the upper wall of the disc slot $N^6$ into engagement with the pin $OL^2$. Therefore a continuation of the downward movement of the shaft $O^9$ will cause a counterclockwise movement of the pivot $L^{10}$ about the pin $OL^2$, as a result of the link connection between the lever OL and the stationary abutment $OL^3$. Such movement of the pivot $L^{10}$ lowers the lever MB and gives a closing movement to the flapper valve $db$ which partially neutralizes the opening movement of that valve produced by the previously mentioned initial action of the lever K. If the movement of lever K is then terminated, as it will be when the trend of the condition has stopped, the upward movement of link DO as a result of the compression of bellows $D^6$ when the pressure in space $D^5$ approaches that of atmosphere, will move link OB clockwise about $d'$ thereby turning lever LB about $L^{11}$ to close the valve $db$. This movement will continue until terminated by engagement of pin $OL^2$ with the bottom of slot $N^6$ when the initial effect will have been removed and thereafter the normal compensating action of bellows $D^6$ will result in turning lever LB about the point of engagement of pin $OL^2$ and the bottom of slot $N^6$ in the clockwise direction to gradually open the valve. Similarly, when the rate of movement of lever K slows down to the extent that the opening movement of the flapper resulting from the clockwise rotation of lever MB about its pivot $L^{10}$ is less than the closing movement of the flapper resulting from the rising of the link DO and coincident counterclockwise movement of LB, the flapper will be given a closing movement tending to remove the initial effect, and when the pin $OL^2$ is thereby contacted by the bottom of slot $N^6$, the subsequent compensating movement of link DO will gradually open the valve.

Various actions may occur in the mechanism of Figs. 10 and 11 depending on the rate of movement of lever K and link DO. If their effective movements are equal and opposite for such time as is necessary to bring pin $OL^2$ into contact with the opposite side of slot $N^6$ the initial effect will not be removed and the effect of further movement of link DO will be added to the effect of the further movement of lever K to counteract the condition change. On a reversal of the trend lever K would be rotated in the reverse direction promptly removing the initial effect as will be clear from the foregoing. With this mechanism we therefore obtain a control action which includes a large initial effect, calculated to arrest and reverse the trend of the condition, which is removed in response to the subsequent trend of the condition and is combined with the follow-up and compensating control actions of the device of Figs. 1-6.

With the mechanism of Figs. 10 and 11, moreover, the magnitude of the follow-up adjustment eventually produced may be varied in a manner analogous to that in which it is varied with the apparatus shown in Figs. 1-6, by adjustment of the abutment member $OL^3$ along the slot $D^{14}$. This follows from the fact that the link OL' connecting the abutment $OL^3$ to the lever OL causes more or less turning movement of the lever LB about the pivot shaft $O^9$ when the pin $OL^2$ is in engagement with either curved wall of the slot $N^6$ in the disc NB, accordingly as the abutment $OL^3$ is anchored in one position or another along the length of the slot $D^{14}$. In general, in any particular control installation, and so long as the general conditions of operation are unchanged, it will be found that optimum control results are obtained with some particular position of the abutment member $OL^3$ along the slot $D^{14}$.

With the apparatus of Figs. 10-11, as with that of Figs. 7-9, the initiation of each compensating adjustment is delayed, following the completion of the preceding follow-up adjustment, during the time required for a relative movement of the pin and slotted lost motion disc, corresponding to the width of the slot in the latter. In this respect, the operation of the apparatus of Figs. 7-11 is analogous to that shown in Fig. 12, in which a different form of lost motion connection is employed. In respect to the variation in relative magnitudes of the follow-up and compensating adjustments under certain different conditions, the operation of the apparatus of Fig. 12 is analogous to that of the apparatus of Figs. 10 and 11.

Figure 12:
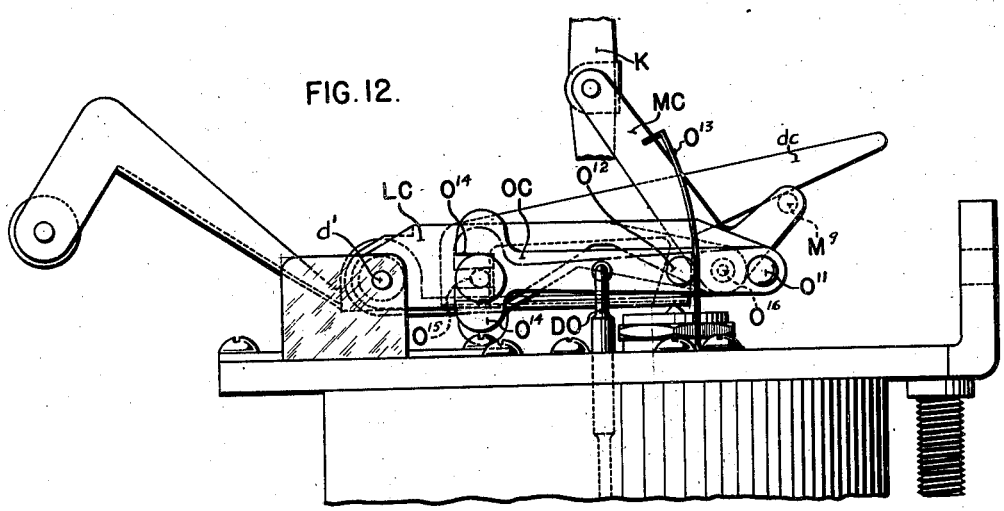
Fig. 12 is an elevation of a portion of a fourth form of control instrument.

Fig. 12 illustrates a third arrangement in which the follow-up link DO acts on the flapper valve through a lost motion connection with the same general results described above as obtainable through such a connection. In Fig. 12 the follow-up link DO is connected to a lever OC which is pivoted at $O^{11}$ to the free end of a lever LC. The latter is journalled on the flapper valve supporting shaft $d'$ and the lever LC carries a pin $O^{12}$ between the shaft $d$ and pivot $O^{11}$ and adjacent the latter which is in frictional engagement with an elongated spring $O^{13}$ secured to the head $D^2$ of the unit D, and shaped to engage the pin $O^{12}$ in all positions of the latter. The lever OC is permitted a limited turning movement relative to the lever LC about their pivotal connection $O^{11}$, by virtue of the fact that the lever OC has fingers or jaws $O^{14}$ separated by a distance substantially greater than the diameter of a pin $O^{15}$ secured to the lever LC and extending between the jaws $O^{14}$. A bell crank lever MC which may be identical with the previously described lever MA, is journalled on a pivot pin $O^{16}$ carried by the lever LC, and has one arm connected to the actuating lever K, the other arm of lever MC carrying a pin $M^9$, engaging a portion of the flapper valve $dc$, so as to give the latter opening movements and restrict its closing movements under the bias closing force which may be applied to the flapper valve as in the construction shown in Figs. 1-6. Except when prevented by engagement of the pin $O^{15}$ with one or the other of the jaws $O^{14}$, the lever OC tends to oscillate about the point of contact with the friction spring $O^{13}$ of the pin $O^{12}$, in response to any force acting on the lever OC and tending to change its position.

When the lever MC is turned counter-clockwise, as seen in Fig. 12, to give an opening adjustment to the valve $dc$, the resultant downward follow-up movement of the link DO will cause the lever OC to turn counter-clockwise, because of the frictional engagement of pin $O^{12}$, and spring $O^{13}$, unless and until the upper jaw $O^{14}$ is in engagement with the pin $O^{15}$. The valve $dc$ is thereby given a further opening or initial effect movement until the engagement of pin $O^{15}$ with the upper jaw $O^{14}$ occurs. With the upper jaw $O^{14}$ in engagement with the pin $O^{15}$, downward movement of the link DO will cause the levers OC and LC to turn clockwise in unison about the shaft $d'$, and through the lever LC will move the lever MC to permit a closing or follow-up movement of the flapper valve $dc$. As in Figs. 10 and 11, a reverse movement of the link DO, as leakage into restriction $D^8$ occurs, and while the lever MC is stationary or while movement of lever MC in the original direction is less than the effective movement of link DO, will result in pin $O^{15}$ traversing the jaw space until the latter is brought into contact with lower jaw $O^{14}$; concurrently moving lever OC counter-clockwise about pivot $O^{12}$ to close valve $dc$ and thus remove the initial effect. Converse actions occur when the lever K adjusts the lever MC in the clockwise direction, as seen in Fig. 12.

Thus in operation the device of Fig. 12 is like the device of Figs. 10 and 11. With the apparatus of Figs. 10 and 11, 12 the elements DO and OB, OC, respectively, are returned to predetermined normal positions when the pressures acting on the inner and outer sides of the bellows $D^6$ are equal and that bellows has assumed its normal length. If the nozzle characteristics are symmetrical, the device will tend to maintain average and balanced movements of the parts whereby pins $OL^2$, $O^{15}$ will be returned to the center of slots $N^6$ and $O^{14}$. The embodiment of Figs. 10-12 do not however include positive return to normal provisions such as provided in Figs. 7-9 by use of lever P and associated parts but in the mechanism of Figs. 13-15 such return to normal provisions are made in a mechanism generally of the type shown in Figs. 10-12.

Figure 13:
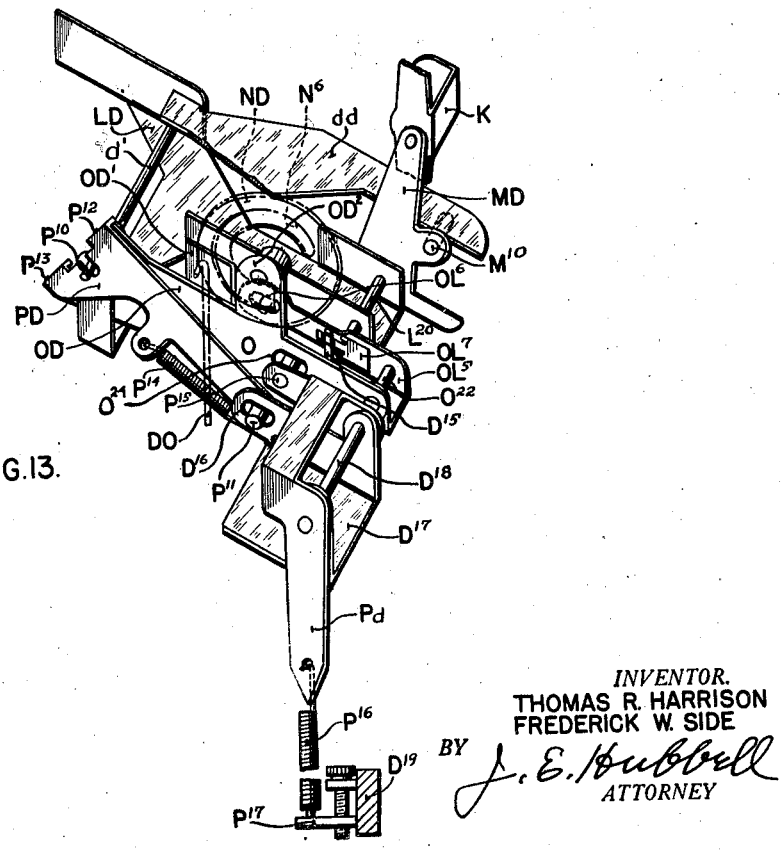
Fig. 13 is a perspective representation of portions of a fifth form of control instrument.
Figure 14:
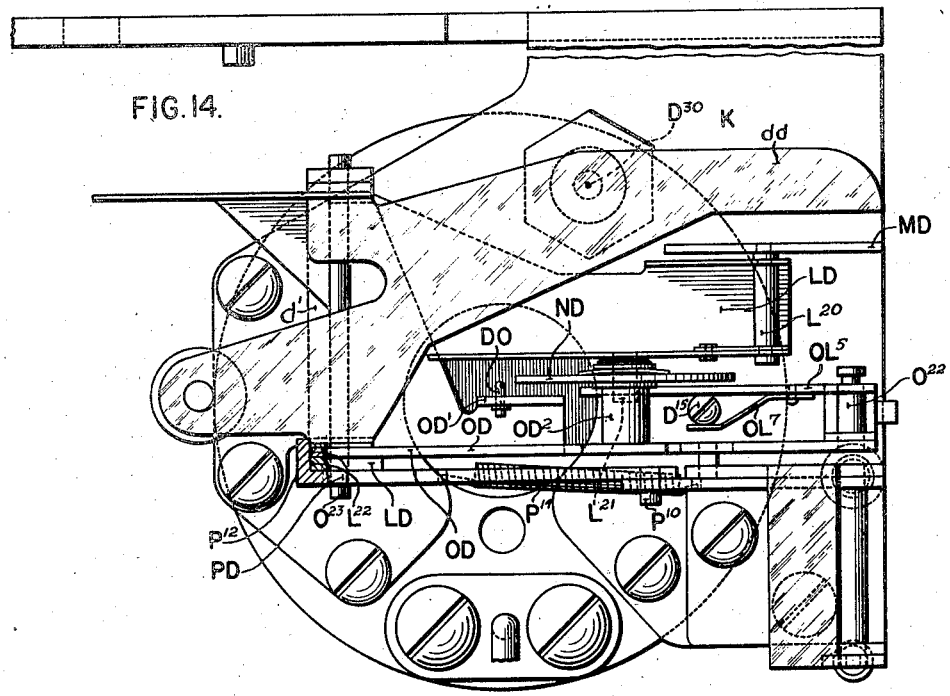
Fig. 14 is a side elevation of a portion of the instrument shown diagrammatically in Fig. 13.
Figure 15:
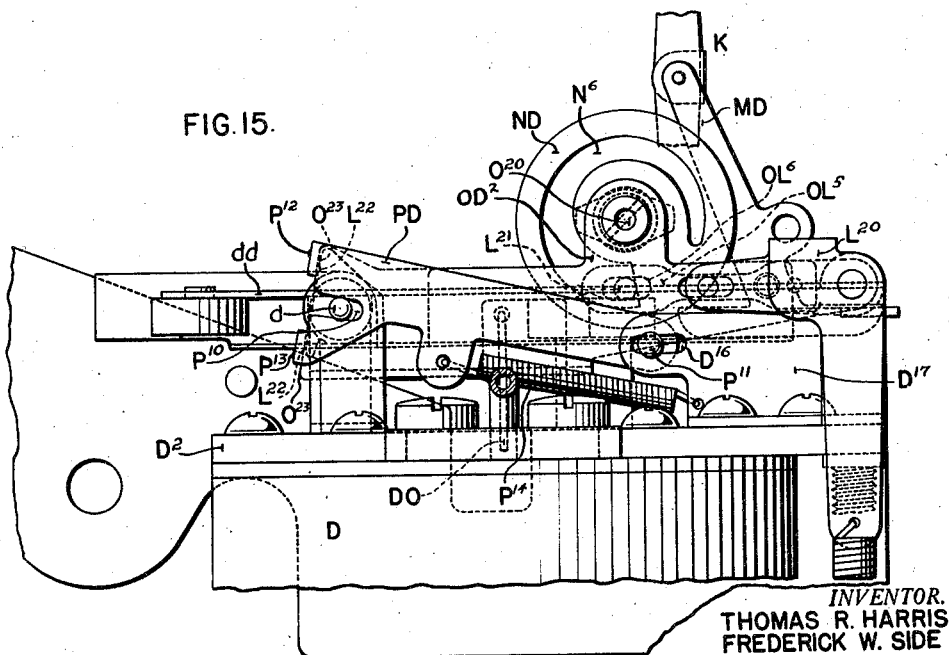
Fig. 15 is a partial elevation taken at right angles to Fig. 14.

The form of the invention shown in Figs. 13, 14, and 15, comprises a lost motion connection between the follow-up link DO and the flapper valve $dd$, and also comprises return to normal provisions, analogous in their general operative effect to the provisions including the lever P of the construction shown in Figs. 7-9. In Figs. 13, 14, and 15, the follow-up link DO is connected to a portion $OD'$ of a lever OD pivotally supported on the shaft $d'$ on which the flapper valve $dd$ is mounted. The lever MD to which the lever $dd$ is connected, carries a pin $M^{10}$ acting on the flapper valve $dd$, and is pivoted on a pivot pin $L^{20}$ carried by a lever LD which is journalled on the shaft $d'$. A lost motion connection between the levers OD and LD comprises a disc ND, like the previously described disc NA, which is angularly adjustable on a supporting pin $O^{20}$ carried by a portion $OD^2$ of the lever OD. The tapered slot $N^6$ of the disc ND receives a pin $L^{21}$ carried by the lever LD.

The action of the lever OD on the lever LD through the disc ND and pin $L^{21}$, is modified by a second connection between those levers, comprising a lever member $OL^5$ pivotally connected to the lever OD through a pivot pin $O^{22}$ and formed with an elongated slot $OL^6$ receiving the pin $L^{21}$. A spring member $OL^7$ secured to the lever $OL^5$ bears resiliently against the side of a post $D^{15}$, supported by, and projecting away from the head $D^2$ of the unit D. Angular movement about the shaft $d'$ in either direction, given the member OD by the link DO, and occurring while the pin $L^{21}$ is out of engagement with either curved slot wall of the disc ND, operates through the lever $OL^5$ to move the lever LD about the shaft $d'$ in the opposite direction. The lever LD is then so moved by the lever $OL^5$, as the result of the turning movement of the latter about the point of frictional contact of its spring $OL^7$ with the post $D^{15}$. The effect of the movement thus imparted to the lever OL through the lever $OL^5$ is to increase the initial opening or closing adjustment of the flapper valve DD, and thus increase the initial kick, not merely by retarding the resultant follow-up adjustment in the opposite direction of the flapper valve, but by actually giving a further adjustment in the same direction as the initial adjustment.

After the turning movement of the lever $OL^5$ has brought the pin $L^{21}$ into engagement with one or the other of the curved walls of the slot $N^6$, further movement of the lever OD produces a corresponding movement of the lever LD about the shaft $d'$ and thereby effects a follow-up adjustment of the flapper valve in a direction opposite to, and partially neutralizing the initial adjustment of that valve.

The return to normal provisions included in the mechanism of Figs. 13, 14, and 15, comprise a member PD movable in a direction generally radial to the shaft $d'$. As shown, the member PD is formed at one end with an open ended slot or guideway $P^{10}$ through which the shaft $d'$ passes. At its opposite end, the member PD is connected to the head $D^2$ of the unit D by a pin and slot connection comprising a pin $P^{11}$ carried by the part PD and working in a slot $D^{16}$ extending in the general direction of the length of the member PD, and formed in a bracket member D$^{17}$ secured to the head D$^2$. At the opposite side of the shaft d' from the pin P$^{11}$, the member PD is provided with lateral extensions P$^{12}$ and P$^{13}$ at the opposite sides of the plane passing centrally through the slot P$^{10}$ and pin P$^{11}$. In the normal position of the parts, the projections P$^{12}$ and P$^{13}$ bear against straight edge portions O$^{23}$ and L$^{22}$ of the levers OD and LD, respectively. A spring P$^{14}$, acting between the head D$^2$ and the member PD, constantly urges the latter toward the position in which both of its projections P$^{12}$ and P$^{13}$ engage portions of the edges O$^{23}$ and L$^{22}$, and hold the levers OD and OL in their normal or neutral positions.

In Figs. 13–15 is also provided means analogous to the pin L' and disc N connection of Figs. 1–6 and the anchorage connection OL$^3$ of Figs. 10 and 11, whereby the rate of follow-up action is governed. In the mechanism of Figs. 13–15 the follow-up movement is governed by the action of a rocking element Pd journalled on a shaft D$^{18}$ parallel to shaft d' and carried by the bracket D$^{17}$. Element Pd carries a pin P$^{15}$ working in a slot O$^{24}$ formed in a portion of the lever OD extending transversely to the shaft d'. A tension spring P$^{16}$, is connected at one end to an arm portion of the member Pd and at its opposite end to a threaded adjusting part P$^{17}$ adjustably connected to a bracket D$^{19}$ carried by the housing or body of the unit D. The spring P$^{16}$ tends to hold the member Pd in the position in which said spring is radial to the pivot D$^{18}$, and in which the pin P$^{15}$ through its engagement with the sides of the slot O$^{24}$, holds the lever OD in its normal position. The analogy of slot N' and spring P$^{16}$ will be more clearly seen when it is considered that if in Fig. 3 the lever L and O were made integral and slot N' omitted and an adjustable spring such as spring P$^{16}$ were applied to pivot M$^2$ radially to pivot d' when the parts were in normal position, the movements of link DO from normal position would be variably opposed in accordance with the existing tension in the spring with the same effect that slot N' variably changes the lever ratios in accordance with its existing angular position, whenever DO moves from its normal position. In the device of Figs. 31–15 the member OD which is directly actuated by link DO, corresponds to the member O of Fig. 3 and when in its normal position the lever OD is given no turning movement by spring P$^{16}$ because the line of action of the spring is then radial to the axis of shaft D$^{18}$. Deflection of member OD from its normal position under the action of link DO will be retarded, however, by an amount depending upon the adjustment of spring P$^{16}$, so that releasing the tension of the latter by the adjusting means D$^{19}$ will permit a greater turning movement of lever OD in response to a given force on link DO.

In operation, on a change in the control condition resulting in an adjustment of the flapper valve dd through the levers K and MD, the resultant follow up movement of the link DO turns the lever OD in the corresponding direction about the shaft d'. The initial portion of that movement of the lever OD about the shaft d' in one direction turns the lever LD about said shaft in the opposite direction, through the lever OL$^5$ which then pivots about the axis of frictional engagement of its spring OL$^7$ with the post D$^{15}$. Such initial turning movement of the lever LD augments the initial kick effect, by a further adjustment of the valve dd in the direction of its original adjustment effected through the levers K and MD. The initial turning movement of the lever LD terminates on the engagement of the pin L$^{21}$ carried by the lever LD with one or the other of the curved walls of the slot N$^6$ in the lost motion disc ND carried by the lever OD. Thereafter a continuation of the follow up turning movement of the lever OD reverses the direction of rotation of the lever and causes the latter to turn about the shaft d' of the lever LD in the same direction as the lever OD to thereby partially neutralize the initial adjustment of the flapper valve dd effected by the levers K and MD. When the follow up movement of the link DO is completed, and the link moves in the opposite direction as a result of the compensating action of the bellows D$^6$, the resultant initial return movement of the lever OD causes the lever OL$^5$ to again pivot on the post D$^{15}$ until the relative movement of the pin L$^{21}$ and disc MD carries the pin LD across the slot N$^3$. This correspondingly delays the initiation of the compensating adjustment of the valve dd, which does not begin until the lever LD starts to move in the same direction as the lever OD, as a result of the engagement of the pin L$^{21}$ with the opposite wall of the slot N$^6$ from that engaged during the follow up adjustment of the lever LD.

Whenever conditions are stabilized long enough for the purpose, the return to normal provisions return the levers OL and OD to their predetermined normal positions. When so returned, the pin L$^{21}$ will be in its mid position between the opposite curved walls of the slot N$^6$, and, through its connection with the lever OL$^5$, will hold the latter in a corresponding intermediate normal position, so that some delay is insured in the follow up adjustment produced after, and as a result of, the next adjustment of the flapper valve dd through the levers K and MD. As will be apparent, the extent of that delay will be a function of the extent of adjustment given the flapper valve and lever LD by the levers K and MD, since the greater the initial adjustment of the flapper valve and lever OL, the greater will be the movement of the lever OD required to produce the relative movement of the pin L$^{21}$ across the slot M$^6$ and into follow-up engagement with a curved wall of the latter.

Figure 16:
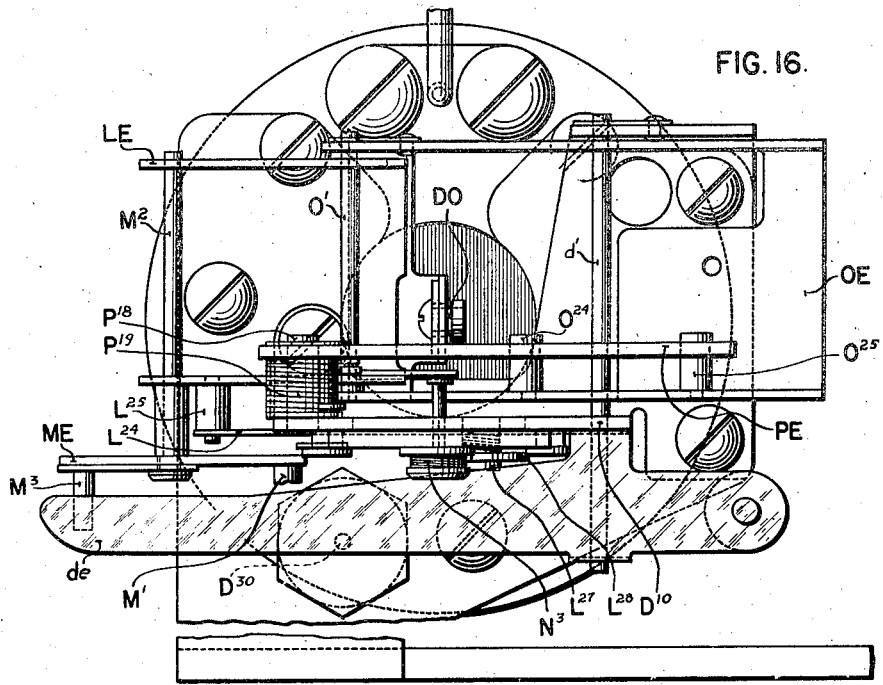
Fig. 16 is a side elevation of a portion of a sixth form of control instrument.
Figure 17:
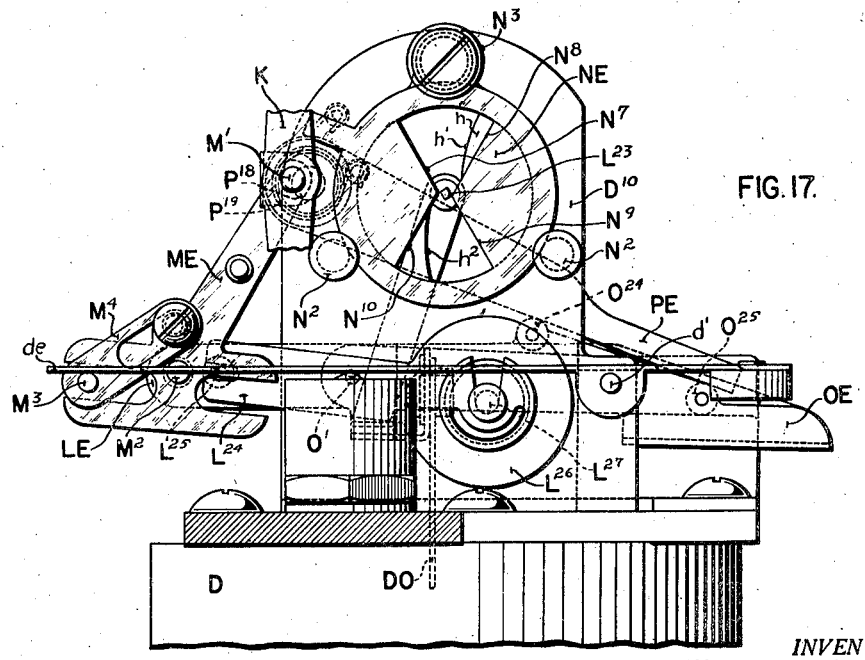
Fig. 17 is a partial elevation taken at right angles to Fig. 16.

The embodiment of the invention illustrated in Figs. 16 and 17, comprises a mechanism which in its general organization, is generally like that of Figs. 1–6, but differs from the latter in the character of the provisions through which the movements of the lever LE, corresponding to the lever L of Figs. 1–6, are guided and controlled to modify the follow up adjustment, and differs, also, in that it includes return to normal provisions.

The mechanism of Figs. 16 and 17 includes parts de, d', OE, O', LE, ME, M', M$^2$, and L$^{23}$, corresponding respectively, to the parts d, d', O, O', L, M, M', M$^2$, and L' of Figs. 1–6. The single member N of Figs. 1–6, however, is replaced in Figs. 16 and 17, by two overlapping cut away or recessed discs NE and n, mounted side by side for independent angular adjustment in the supports N$^2$ and N$^3$, and collectively forming a slot or space, which receives the pin L$^{23}$ carried by the lever LE but differs in shape from the slot N' in the member N. The width of the slot or space receiving the pin L$^{23}$ increases with the distances from the axes of the discs NE and n. At one side of that axis, one wall of the slot or space is formed by the straight edge portion N$^7$ of the cut away disc NE which is tangential to a small circle surrounding said axis. At the opposite side of said axis, one wall of the space is formed by another straight edge portion $N^9$ of the cut away disc NE. The edge portion $N^9$ may be, and is shown as, parallel to the edge $N^7$ and displaced from the latter by the diameter of said small circle. The side portion of the slot or space opposite the straight edge portion $N^7$, is formed immediately adjacent the axes of the discs NE and $n$ by a straight edge portion $N^8$ of the disc NE diverging from the edge $N^7$, and more remote from said axes, is formed by the edge $n'$ of a cut away portion of the disc $n$. The edge $n'$, as shown, is curved and has its convex side toward the edge $N^7$. The side of the slot or space portion opposite to the edge $N^9$ is similarly formed by a straight edge portion $N^{10}$ parallel to the edge $N^8$, and by the edge $n^2$ of a cut away portion of the disc $n$. The edge portion $n^2$ is shown as curved and having its concave side toward the edge $N^9$.

An arm $L^{24}$ is pivotally connected at one end to a pin $L^{25}$ carried by the lever LE, and adjacent and parallel to the pivot shaft $M^2$ which connects the levers ME and LE. At its opposite end, the arm $L^{24}$ is provided with a disc like enlargement $L^{26}$, which is journalled on a pin $L^{27}$ carried by the end head bracket $D^{10}$, and is held in frictional engagement with the latter by a spring device $L^{28}$. The arm $L^{24}$ thus tends to hold the axis of the pin $L^{25}$ in a stationary position, notwithstanding movement given to the lever LE by the lever OE through the pivot shaft $O'$, unless and except as turning movement of the lever LE about the axis of the pin $L^{25}$ is restrained by the engagement of the pin $L^{23}$ with one of the edges $N^7$, $N^8$, $N^9$, $N^{10}$, $n'$, $n^2$. The pin $L^{25}$ is displaced from the shaft $m^2$, so that the turning movement of the lever LE about the pin $L^{25}$, occurring while the axis of the latter is stationary, produces a significant movement of the shaft $M^2$ on which the lever ME is mounted. The functions of the parts which are common to Figs. 10–15 and 16, 17 are identical to those described in connection with Figs. 10–15.

The return to normal provisions of Figs. 16 and 17 comprise a lever arm PE pivoted on a pin $P^{18}$ carried by the stationary bracket $D^{10}$, and acted on by a spring $P^{19}$ which tends to move the arm PE clockwise about the pin $P^{18}$ as seen in Fig. 17, until the motion of the arm is arrested by engagement with abutment pins $O^{24}$ and $O^{25}$ carried by the lever OE at opposite sides of the shaft $d'$. When the arm PE is in engagement with both pins $O^{24}$ and $O^{25}$, the levers OE and LE are held in their neutral positions. In the neutral position of the lever LE, its pin $L^{23}$ is between the inner ends of the edges $N^7$ and $N^9$ and substantially coaxial with the discs NE and $n$.

On a clockwise adjustment of the lever ME, as seen in Fig. 17, giving an opening movement to the flapper valve $de$ the resultant follow-up movement of the link DO, will give a counter-clockwise adjustment of the lever OE about its supporting shaft $d'$, and causes the lever LE to turn clockwise about the pin $L^{25}$ and thus move the pin $L^{23}$ into the space at the side of the disc edge $N^9$. With the disc NE adjusted, as shown, its edge $N^9$ will be substantially parallel to the short arc of movement of the pin $L^{25}$, and will have no controlling effect on the path of movement of the pin $L^{23}$. With the disc NE adjusted clockwise from the position shown in Fig. 17, however, the movement of the pin $L^{23}$ will be modified by the engagement of the pin with the edge $N^9$, with the result that the counter-clockwise movement of the lever OE will produce a counter-clockwise movement of the pin $L^{25}$. The extent of such movement of the pin $L^{25}$ will be greater or less, accordingly, as the disc NE is adjusted clockwise for a greater or lesser amount from the position shown in Fig. 17. In any event, under the conditions described, the pin $L^{23}$ will be either in contact with, or adjacent the edge $N^9$ at the end of the follow-up adjustment movement of the link DO and lever OE. The movement of lever LE about pivot $L^{25}$, when the pin $L^{23}$ is unrestrained, will result in an adjustment of the flapper valve $de$ away from the nozzle, thereby causing a correction in the same direction as the original correction, but downward movement of lever LE about shaft $d'$ when pin $L^{23}$ is in effective engagement with surface $N^9$ will result in a closing movement of flapper valve $de$ due to the downward movement of pivot $L^{25}$. The ratio of the portion of the downward travel of link DO which results in further opening or initial effect movement of valve $de$ to the portion of the downward travel of link DO which results in closing or follow-up movement of valve $de$ will depend upon the angle of surface $N^9$ and therefore on the angular position of disc NE which is adjustable.

Thereafter when the return or compensating movement of the link DO gives a clockwise adjustment to the lever OE, a compensating adjustment of the flapper valve $de$ will or will not be effected, accordingly, as the initial movement of the link DO has resulted in a follow-up adjustment of the valve. If the valve has been subjected to a follow-up adjustment, the time during which that adjustment is neutralized by a compensating adjustment, will be dependent, in general, on the angular adjustment of the disc $n$, and the shape of the edge $n^2$ of that disc.

When the counter-clockwise adjustment of lever OE results in a movement of the pin $L^{23}$ which is not modified by the engagement of the pin with the edge $N^9$, the subsequent compensating clockwise movement of the lever OE, will merely cause the pin $L^{23}$ to retrace its path of movement away from its neutral position shown in Fig. 17. If, however, the adjustment of the disc NE is such that the edge $N^9$ is engaged by the pin $L^{23}$, as the latter moves away from its neutral position, the return movement of the pin $L^{23}$ will cause the latter to engage and move along the edge $N^{10}$, or first to engage the edge $n^2$ and move along the latter until it engages and is thereafter guided by the edge $N^{10}$. During the latter action the lever LE will be turned counter-clockwise about $L^{25}$ permitting a lowering of shaft $M^2$ and closing of valve $de$ which will continue until pin $L^{23}$, which will then leave surface $N^9$, contacts surface $n^2$ of disc $n$ or surface $N^{10}$ of disc. The nature of the latter action is to remove the initial valve effect as in Figs. 10–15, except that with the device of Figs. 10–15, the magnitude of the initial effect removal is fixed, whereas in the mechanism of Figs. 16 and 17, the amount of initial effect removal will depend upon the extent of departure from normal, because the further pin $L^{23}$ has progressed along surface $N^9$ away from its normal position the greater will be the angular movement through which lever LE will be permitted to turn before pin $L^{23}$ thereof contacts edge $n^2$ and accordingly the greater will be the closing movement of flapper $de$. Continued compensated rising movement of link DO with pin $L^{23}$ in contact with surface $n^2$ or $N^{10}$ will result in turning lever LE counter-clockwise about $O'$ as the latter is raised thereby opening valve $de$ and moving pin $L^{23}$ upward along surfaces $n^2$ or $N^{10}$ toward its neutral position.

The path followed by the pin $L^{23}$ in its return movement, thus depends not only upon the adjustment of the disc NE, but also on the adjustment of the disc $n$, which fixes the position of the edge $n^2$. The adjustment of the disc NE determines the application of the combined follow-up initial effect and compensating adjustments of valve $de$. The adjustment of the disc $n$ determines the compensated and initial effect removal adjustments.

Any adjustment of the disc NE counter-clockwise, from the position shown in Fig. 17, is an idle adjustment, since the pin $L^{23}$ can not engage the edge $N^9$ as it moves away from its neutral position. If the disc $n$ is adjusted far enough in the clockwise direction from the position shown in Fig. 17, the pin $L^{23}$ can be guided in the above described movements only by its engagement with the edges $N^9$ and $N^{10}$ of the disc NE. Operations which are the converse of those just described will occur when the initial adjustment of the flapper valve is a closing adjustment. In such case, the extent of guidance given the pin $L^{23}$ and resultant adjustment of the pin $L^{25}$ will depend on the positions into which the edges $N^7$ and $N^8$, and $n'$ are adjusted.

The lever PE which through its engagement with the pins or shoulders $O^{24}$ and $O^{25}$ of the lever OE tend to hold the latter in a normal position and to return the lever to that position when displaced therefrom, modifies the movements of the link DO in the manner previously described as characteristic of a return to normal action on a lever to which the link DO is connected.

In general organization and operation, the form of the invention shown in Figs. 18 and 19, is much like that shown in Figs. 16 and 17. The parts $df$, OF, O', LF, and $L^{29}$, and $L^{32}$ of Figs. 18 and 19 correspond respectively to the parts $de$, OE, O', LE and $L^{23}$ to $L^{27}$ of Figs. 16 and 17.

In Figs. 18 and 19, however, the arm $L^{30}$ acting on the pin $L^{31}$, and thereby tending to cause the lever LF to turn about that pin when the lever OF is moved, is provided with spring arm extensions $L^{33}$ which frictionally engage the stationary bracket $D^{10}$. In Figs. 18 and 19, also, the levers OF and LF have a lost motion connection including a pin $O^{26}$ carried by the lever OF and received in the tapered slot $N^6$ in a disc NF, like the previously described disc NA. The disc NF is mounted on, and angularly adjustable about a supporting pin $L^{34}$ carried by the lever LF. In Figs. 18 and 19, also, the lever OF is acted on by a return to normal lever Pd journaled on a shaft $D^{18}$, and is spring biased and connected to the lever OF through a pin and slot connection including a pin $O^{27}$, generally, as the lever Pd of Figs. 13, 14, and 15, is journaled, spring biased, and connected to the lever OD.

In Figs. 18 and 19, the pin $L^{29}$ corresponding to the pin $L^{23}$ of Figs. 16 and 17, works in a slot space of general hourglass shape, which is formed in a single disc member Nf. The latter is mounted on the bracket $D^{10}$ for angular adjustment about the disc axis. When thel ever MF given an opening adjustment to the flapper valve $df$, the resultant downward movement of link DO and counter-clockwise movement of lever OF to which link DO is connected moves the pin $L^{29}$ downward as seen in Fig. 19 into a space defined by edges $N^{90}$, $N^{91}$, and $N^{92}$ of the disc Nf. Conversely, movement of the pin $L^{29}$ upward from the normal position shown in Fig. 19 carries the pin into a space defined at its sides by edges $N^{70}$, $N^{71}$, and $N^{72}$ of the disc Nf. The edges $N^{70}$ and $N^{90}$ are parallel to one another, as are the edges $N^7$ and $N^9$ of Fig. 17. At a compartively short distance from the axis of the disc Nf, however, the edge $N^{70}$ ends at its intersection with an edge $N^{71}$ which is a straight edge, and is inclined to the edge $N^{70}$ at an angle somewhat greater than 90°. Similarly the edge $N^{90}$ ends at its intersection with a straight edge $N^{91}$ inclined to the edge 90 at an angle somewhat greater than 90°. The edges $N^{72}$ and $N^{92}$ are curved generally as are the edges $n'$ and $n^2$ of Figs. 16 and 17.

In its neutral position shown in Fig. 19, the pin $L^{29}$, which is rectangular in cross section, has its wider sides parallel to, and fitting between and overlapping portions of the edges $N^{70}$ and $N^{90}$. The initial movement of the pin $L^{29}$ out of, and its final movement into its neutral position, is thus necessarily in the direction parallel to the sides $N^{70}$ and $N^{90}$, and radial to the axis of the disc Nf. When the latter is angularly adjusted about its axis, the pin $L^{29}$ must be similarly adjusted in the lever LF. The distance through which the pin movement is necessarily parallel to the edges $N^{70}$ and $N^{90}$, depends on the width of the sides of the pin $L^{29}$, then engaging those edges, and the relative lateral positions of the edges $N^{72}$ and $N^{92}$.

In operation a downward movement of link DO as a result of movement of valve $df$ away from the nozzle will turn lever OF about shaft $d'$ in the counter-clockwise direction, thereby rotating lever LF clockwise about pivot $L^{31}$ and further opening valve $df$ and thus producing an initial effect as in the mechanism of Figs. 10–17. The opening movement of valve $df$ will continue until pin $O^{26}$ of lever OF is contacted by the top of slot $N^6$ in disc NF carried by lever LF and thereafter the down movement of link DO will result in a closing or follow-up movement of valve $df$.

The action of the device of Figs. 18 and 19 during the period in which pin $O^{26}$ is traversing slot $N^6$ will be like that of the embodiment of Figs. 16 and 17 and the proportion of follow-up and initial effect will be governed by the angularity of disc Nf. With the disc Nf, so adjusted that pin $O^{26}$ will contact the top of its slot before pin $L^{29}$ has progressed to the end of edge $N^{90}$ the edge $N^{91}$ will not be contacted by pin $L^{29}$ but edge $N^{91}$ will only be contacted by pin $L^{29}$ when the active portion of slot $N^6$ is sufficiently wide to permit such contact. Without disc Nf no follow-up movement will occur during the period in which pin $O^{26}$ traverses slot $N^6$ and with a narrow adjustment of the latter the same condition prevails when surface $N^{90}$ is substantially arcuate about the axis of pivot $L^{31}$ when the part LF is in its neutral position. When surface $N^{90}$ is turned clockwise from the last mentioned position a variable degree of follow-up movement may be obtained during the period in which pin $O^{26}$ traverses slot $O^{26}$ by virtue of the contact of pin $L^{29}$ with surface $N^{90}$ resulting in lowering shaft $M^2$ and consequent closing or follow-up movement of flapper valve $df$. Following the contact of pin $O^{26}$ with the upper edge of slot $N^6$ the further downward movement of link DO will cause a further follow-up movement during which pin $L^{29}$ will leave contact with edge $N^{90}$ or $N^{91}$.

The disc Nf may be adjusted so that little or no follow-up adjustment will be given the flapper valve by a follow-up movement of the lever OF not great enough to move the pin $L^{29}$ into engagement with the edge $N^{71}$ or $N^{91}$. In general, when the pin engages either of the last mentioned edges, a follow-up adjustment of the flapper valve will result, the magnitude of which will depend not only on the angular movement of the lever OF, but on the angular adjustment of the disc $Nf$. Any actual valve adjustment will normally be followed by a compensating or return adjustment, more or less of which will be produced by, and as a result of the engagement of the pin $L^{29}$ with the edge $N^{72}$ or $N^{92}$, and will be dependent on the form and adjustment position of that edge. The final portion of the compensating adjustment, however, cannot be effected until the pin $L^{29}$ moves out of engagement with the edge $N^{72}$ or $N^{92}$ along which it has been travelling, and moves radially into its central position in which it overlaps the edges $N^{70}$ and $N^{90}$.

It hardly needs to be pointed out that the action just described may be obtained with the arrangement of Figs. 16 and 17, as by the relative shaping and disposition of the pin $L^{23}$ and edges $N^7$, $N^8$, $N^9$, and $N^{10}$ shown in Fig. 19A. In Fig. 19A the return surfaces $N^8$ and $N^{10}$ are provided with projections adjacent the normal position of pin $L^{23}$ so that in the return movement of the latter a slight correction will be applied tending to completely restore the condition to normal which correction will be removed as the pin $L^{23}$ finds its normal position and the device is in equilibrium. The same general effect is obtained in Figs. 18 and 19 by means of the overlap of surfaces $N^{72}$ and $N^{92}$ and pin $L^{29}$.

Although we have found it desirable in practice to provide the feature in the embodiments of Figs. 10–19A whereby the initial effect may be removed before the temperature trend reverses, we may, in the various embodiments disclosed in those figures attain a control action more nearly analogous to the action of the device of Figs. 7–9, in which the initial effect is not removed until the temperature trend reverses, by making changes in each of the figures equivalent to the change in Figs. 18 and 19 which would result from the elimination of pivotal point $L^{31}$ and making the spring $L^{30}$ effective upon the axis of shaft $M^2$.

Our previously mentioned prior application Ser. No. 693,388 of which the present application is a continuation in part, discloses a control unit practically identical in form and substance with the control units shown in Figs. 1–6 of the present application, except in respect to the mechanism with which the bellows element, designated $D^6$ herein, coacts for flapper valve adjustment. It is our intention to claim in our said prior application all features of our invention disclosed in common therein and in this case, except the features dependent on or comprising the hereinbefore described return to normal provisions, one form of which we have disclosed in said prior application.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims and that in some cases certain features of our invention may be used to advantage without a corresponding use of other features.

Having now described our invention, what we claim as new and desire to secure by Letters Patent, is:

1. An air actuated controller comprising an air space, valve means regulating the pressure in said space, a device for adjusting said valve means in accordance with a control condition, and a mechanism which is responsive to changes in said pressure and is actuated on a change therein to give said valve means a second adjustment tending to a reverse change in said pressure and a subsequent adjustment opposite in direction to said second adjustment, and which comprises means adjustable to continuously and progressively modify the adjustment effect of said mechanism on said valve means.

2. A controller as specified in claim 1, in which the adjustable means of said mechanism is adapted to proportionally vary the extent of the initial and subsequent adjustment of the valve means produced by said mechanism on a change in said pressure.

3. An air actuated controller comprising an air space, valve means regulating the pressure in said space, a device for adjusting said valve means in accordance with a control condition, and a mechanism responsive to changes in said pressure and actuated on a change therein to give said valve an initial adjustment tending to a reverse change in said pressure, and a subsequent adjustment opposite in direction to said initial adjustment, said mechanism comprising an element moved by a change in said pressure first in one direction and then in the opposite direction, and a second element actuated by the first mentioned element during a final portion only of the movement of the latter in said one direction and in said opposite directions, respectively, to effect said initial and subsequent valve means adjustments.

4. An air actuated controller comprising an air space, valve means regulating the pressure in said space, a device for adjusting said valve means in accordance with a control condition, and a mechanism responsive to changes in said pressure and actuated on a change therein to give said valve an initial adjustment tending to a reverse change in said pressure, and a subsequent adjustment opposite in direction to said initial adjustment, said mechanism comprising an element moved by a change in said pressure first in one direction and then in the opposite direction, and a second element actuated by the first mentioned element during a final portion only of the movement of the latter in said one direction and in said opposite directions, respectively, to effect said initial and subsequent valve means adjustments, said portions being regulable.

5. An air actuated controller comprising an air space, a valve means regulating the pressure in said space, and valve operating means comprising a floating lever, two links by which said lever is suspended, means for adjusting one of said links in accordance with the departure of a control quantity from the normal value thereof, and means for adjusting the other of said links to vary the normal value of said control quantity.

6. An air actuated controller comprising an air space, valve means regulating the pressure in said space, and valve operating means for adjusting said valve means in accordance with the departure of a control quantity from a normal value thereof, comprising a floating lever, two members engaging said lever at spaced apart points, means for automatically adjusting one of said members in accordance with changes in value of the control quantity, and means for adjusting the other of said members to vary the said predetermined normal value.

7. An air actuated controller comprising an air space, valve means regulating the pressure in said space, and valve operating means for adjusting said valve means in accordance with the departure of a control quantity from a normal value thereof, comprising a floating lever, two members engaging said lever at spaced apart points, means for automatically adjusting one of said members in accordance with changes in value of the control quantity, and means for adjusting the other of said members to vary the said predetermined normal value, each of said means comprising an element oscillating about the same axis as the element of the other means, and each of said members being a link connecting the corresponding element to said lever.

8. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment and which comprises means for effecting the initial and final portions of said subsequent adjustment at different rates.

9. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, and which comprises means for effecting the initial and final portions of said subsequent adjustment at slow and rapid rates, respectively.

10. An air actuated controller comprising an air space, valve means regulating the pressure in said space, a device for adjusting said valve means in accordance with a control condition, and a mechanism which is responsive to changes in said pressure and which is adapted on a change therein to give said valve means an initial adjustment tending to a reverse change in said pressure, and a delayed subsequent adjustment opposite in direction to said initial adjustment and which comprises means for expediting the last mentioned adjustment in the final portion thereof.

11. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever through which the turning movements of the first mentioned lever effect adjustments of said valve means, and a lost motion connection between said levers permitting a limited initial turning movement of the first mentioned lever without a corresponding movement of said second lever, and compelling a turning movement of said second lever on a further movement of the first mentioned lever.

12. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising two levers each turning about the same stationary axis, a member operatively engaging one of said levers at one distance and the other at a different distance from said axis, means engaging a portion of said member at a distance from said axis which is intermediate the first two distances, and tending to hold said member stationary, and a lost motion connection between said levers limiting the turning movement of each lever relative to the other.

13. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever through which the latter acts on said valve means, means cooperating with said second lever and tending to cause the latter to turn about the axis of the pivotal connection of the two levers, and about an axis laterally displaced from said pivotal connection on turning movements of the first mentioned lever, and a lost motion connection between said levers limiting the turning movement of said second lever relative to the first mentioned lever.

14. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever through which the latter acts on said valve means, means cooperating with said second lever and tending to cause the latter to turn about the axis of the pivotal connection of the two levers, and about an axis laterally displaced from said pivotal connection on turning movements of the first mentioned lever, and an adjustable lost motion connection between said levers limiting the turning movement of said second lever relative to the first mentioned lever.

15. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever, through which the latter acts on said valve means, means cooperating with said second lever and tending to cause the latter to turn about the axis of the pivotal connection of the two levers, and about an axis laterally displaced from said pivotal connection on turning movements of the first mentioned lever, a lost motion connection between said levers limiting the turning movement of said second lever relative to the first mentioned lever, and means tending to maintain each lever in a normal position of the latter.

16. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever through which the turning movement of the first mentioned lever adjusts said valve means, means engaging said second lever at a distance from said pivotal connection tending to turn said second lever about the axis of such engagement, and a lost motion connection between said levers limiting the turning movement of said second lever relative to the first mentioned lever.

17. An air actuated controller comprising an air space, valve means regulating pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever, means cooperating with said second lever and tending to cause the latter to turn about the axis of the pivotal connection between the levers and about an axis laterally displaced from said pivotal connection, and a lost motion connection between said levers limiting the turning movement of said second lever relative to the first mentioned lever.

18. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, and parts through which said turning movements effect adjustments of said valve means, said parts including a second lever connected to the first mentioned lever to turn relatively thereto about a pivot axis at a distance from the first mentioned axis, a part operatively engaged by a portion of said second lever at a distance from said pivot axis through which movements of said second lever portion effect valve adjustments, yielding means engaging said second lever and tending to hold the said portion approximately stationary and thereby give said second lever turning movements about said pivot axis when the first mentioned lever turns about the first mentioned axis, and means limiting said turning movements.

19. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, and parts through which said turning movements effect adjustments of said valve means, said parts including a second lever connected to the first mentioned lever to turn relatively thereto about a pivot axis at a distance from the first mentioned axis, a part operatively engaged by a portion of said second lever at a distance from said pivot axis through which movements of said second lever portion effect valve adjustments, yielding means engaging said lever and tending to hold said portion approximately stationary and thereby give said second lever turning movements about said pivot axis when the first mentioned lever turns about the first mentioned axis, and means adjustable to variably restrict said turning movements.

20. In control apparatus, the combination of a member, a second member, and an adjustable lost motion connection through which movements of the first mentioned member produce movements of said second member, said lost motion connection comprising a part connected to one of said members for adjustment relatively thereto about an axis and formed with a guideway curved about said axis and having its inner and outer sides separated by a distance varying along the length of said guideway, and a part carried by the other member and extending into said guideway and movable relatively to the latter between adjacent portions of the inner and outer sides thereof.

21. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever through which the turning movements of the latter effect adjustments of said valve, and guiding means cooperating with said second lever to turn the latter about the axis of said pivotal connection on turning movements of the first mentioned lever.

22. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever, means tending to turn said second lever about the axis of the pivotal connection between said turning movements of the first mentioned lever, and guiding means engaging said second lever and controlling its movements about the last mentioned axis.

23. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever, means tending to turn said second lever about the axis of the pivotal connection between said turning movements of the first mentioned lever, guiding means engaging said second lever and controlling its movements about the last mentioned axis in one direction, and other guiding means engaging said second lever and controlling its movement in the opposite direction.

24. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever, means tending to turn said second lever about the axis of the pivotal connection between said turning movements of the first mentioned lever, guiding means engaging said second lever and controlling its movements about the last mentioned axis in one direction, and other guiding means engaging said second lever and controlling its movement in the opposite direction, one of the two last mentioned means being adjustable.

25. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure, and a subsequent adjustment opposite in direction to said initial adjustment, said mechanism comprising a lever turning about a stationary axis, a second lever pivotally connected to the first mentioned lever, means tending to turn said second lever about the axis of the pivotal connection between said turning movements of the first mentioned lever, guiding means engaging said second lever and controlling its movements about the last mentioned axis in one direction, and other guiding means engaging said second lever and controlling its movement in the opposite direction, said last mentioned means being independently adjustable.

26. An air actuated controller comprising an air space, valve means regulating pressure in said space, a device for adjusting said valve means in accordance with a control condition, and a mechanism which is responsive to changes in said pressure and is actuated on a change therein to give said valve means an initial adjustment tending to a reversed change in said pressure, and a subsequent adjustment opposite in direction to said initial adjustment, said mechanism comprising a lever turning about a stationary axis, a second lever pivotally connected to the first mentioned lever, and a lost motion connection between said levers limiting the turning movement of said second lever relative to the first mentioned lever.

27. In a control system, the combination of a device adjusted to different positions in accordance with changes in a variable control condition, air pressure controlled means, a valve mechanism adjustable to regulate the air pressure acting on said means, means through which a movement of said device from one position to another adjusts said valve mechanism to vary said pressure in a direction and to an extent depending upon the direction and magnitude of said movement, mechanism operating independently of the position of said device and actuated by changes in said pressure to effect an adjustment of said valve mechanism in a direction and to an extent partially neutralizing said change and including means for subsequently eliminating said adjustment, and adjusting means for varying the extent of said adjustment and for increasing or decreasing the time required for the subsequent elimination of said adjustment accordingly as the extent of the latter is increased or decreased.

28. An air control unit comprising an air chamber and a flexible element forming a portion of the wall of said chamber and moving in response to pressure changes in said chamber, means for maintaining a variable air pressure in said chamber comprising a port communicating with said chamber and a valve controlling flow through said port, a second flexible wall element connected to the first mentioned element to provide a chamber space between the two elements, said space being in restricted communication with the atmosphere and the side of said second element remote from said space being directly exposed to the pressure of the atmosphere, an operating connection between said valve member and said second element through which movements of the latter move said valve member toward and away from said port, a second operating connection for said valve movable independently of the first mentioned connection to move said valve toward and away from said port, and means subjecting said second element to an adjustable force opposing movement of said second element away from and tending to return it to a predetermined position from which it moves when the pressure within said space differs from that of the atmosphere.

29. An air control unit comprising a rigid casing part, a flexible wall element connected to said part to form an air chamber between said part and element, means for maintaining a variable air pressure in said chamber comprising a port communicating with said chamber and a valve member controlling flow through said port, a second flexible wall element connected to the first mentioned element to provide a chamber space between the two elements, said space being in restricted communication with the atmosphere and the side of said second element remote from said space being exposed to the pressure of the atmosphere, an operating connection between said valve member and said second element through which movements of the latter move said valve member toward and away from said port, a second operating connection for said valve member movable independently of the first mentioned connecting to move said valve toward and away from said port, and means subjecting said second element to an adjustable force opposing movement of said second element away from, and tending to return it to a predetermined position from which it moves when the pressure within said space differs from that of the atmosphere.

30. An air control unit comprising an air chamber having a flexible wall element moving in response to pressure changes in said chamber, means for maintaining a variable air pressure in said chamber comprising a port communicating with said chamber and a valve controlling flow through said port, a second flexible wall element connected to the first mentioned element to provide a chamber space between the two elements, said space being in restricted communication with the atmosphere and the side of said second element remote from said space being directly exposed to the pressure of the atmosphere, a movable member on which said valve is mounted, a connection between said member and said second element, adjustable resilient means for subjecting said movable member to an adjustable force opposing and minimizing movement of said member effected by said connection away from, and tending to return said movable member to a predetermined position from which said second element moves when the pressure within said space differs from atmospheric pressure, and a valve adjusting part mounted on and movable relative to said movable member, whereby the position of said valve member relative to said port is dependent jointly on the position of said movable member and on the position relative to the latter of said movable part.

31. In control apparatus, the combination of a device adjusted to different positions in accordance with the changes in a variable control condition, air pressure actuated controlled means, a valve mechanism adjustable to regulate the air pressure acting on said means, means through which a movement of said device from one position to another adjusts said valve mechanism to vary said pressure in a direction and to an extent depending upon the direction and magnitude of said movement, other means subjected to and actuated by a pressure variation produced by the adjustment to thereby adjust said valve mechanism in the direction to partially neutralize said pressure variation of said valve mechanism to partially neutralize said adjustment, and means retarding the operation of said other means following the subjection of the latter to said pressure variation in either direction.

32. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to change said pressure and a subsequent adjustment opposite in direction to said initial adjustment, and which comprises means adjustable without interference with the operation of the controller to modify the adjustment effect of said mechanism on said valve means.

33. An air actuated controller for controlling a variable condition comprising an air space, a port communicating with said space, a member cooperating with said port to control the pressure in said space, an air controlled motor responsive to the pressure in said space and controlling said condition, and mechanism responsive to said condition adapted to first actuate said member toward or away from said port on a departure of said condition from a normal value of the latter, to later actuate said member away from or toward said port continuously and progressively in response respectively to the first actuation and to delay the last mentioned actuation until the member has progressed toward or away from said port, a predetermined amount under the first actuation.

34. An air actuated controller for controlling a variable condition comprising an air space, a port communicating with said space, a member cooperating with said port to control the pressure in said space, an air controlled motor responsive to the pressure in said space and controlling said condition, and mechanism responsive to said condition to first actuate said member toward or away from said port on a departure of said condition from a normal value of the latter, to later actuate said member away from or toward said port continuously and progressively in response respectively to the first actuation and to delay the last mentioned actuation until the member has progressed toward or away from said port, a predetermined adjustable amount under the first actuation.

35. A controller for controlling a variable condition comprising a controlled motor for controlling a corrective agent for said condition, a pair of elements the cooperation between which controls said motor, and mechanism responsive to deviations of said condition from a normal value thereof to first vary the cooperation of said elements in a sense such as to operate said motor to apply a correction to oppose such deviation, to later vary the cooperation of said element in a sense such as to operate said motor continuously and progressively in a direction tending to neutralize the first correction and to delay the second variation until a predetermined first variation has occurred.

36. A controller for controlling a variable condition comprising, a controlled motor for controlling a corrective agent for said condition, a deflecting element for controlling said motor, and mechanism responsive to deviations of said condition from a normal value thereof to first vary the position of said element in a sense as to operate said motor to apply a correction to oppose such deviation, to later vary the position of said element in a sense such as to operate said motor continuously and progressively in a direction tending to neutralize the first correction and to delay the second variation until a predetermined first variation has occurred.

37. In a control apparatus, the combination of a measuring element, a movable control member controlled by said element, means controlled by the position of said member for controlling the application of a corrective agent, the said means having positions corresponding to positions of the member, and said member having positions corresponding to positions of the element, means initiated by a movement of said element to a different position to move said member in one direction an amount corresponding to the amount necessary for said member to move to bring the latter into a position corresponding to the said position of said element and a predetermined additional amount and to subsequently move said member in the opposite direction an amount equal to said additional amount whereby the ultimate position of said member corresponds to the said position of said element.

38. A controller for controlling a variable condition comprising a controlled motor for controlling a corrective agent for said condition, a first element associated with the controlled motor, a second element actuated by a change in the variable condition and cooperating with the first element to control the controlled motor, the controlled motor having positions corresponding to relative positions of said elements, and means responsive to actuation of the second element on a change in said condition continuously and progressively to actuate the first element in the reverse sense including means to predetermine the time of the occurrence of the reverse actuation.

39. In control apparatus, the combination of a number under control of a variable condition for effecting a control action, a second member, and a lost motion connection adjustable to vary the extent of lost motion which it permits, through which the movements of the second member produce movements of the first member tending to neutralize the control action effected by the latter, and means responsive to the control actuation of the first member for moving the second member.

40. In control apparatus, a supporting structure, a vent nozzle supported thereon and a valve member angularly adjustable about an axis in fixed relation with said nozzle to thereby variable throttle the discharge through said nozzle, means coacting to determine the angular adjustment of said member about said axis and comprising one element adjusted by variations in the magnitude of a variable control quantity, a second element adjusted by changes in the pressure in said nozzle, and a third element adjustable to determine the normal condition which said apparatus tends to maintain, and freely moving lever and link mechanism operatively connecting the three elements to said member and adapted to permit the adjustment of any one of said three elements, without adjustment of either of the other two elements.

41. In apparatus for automatically controlling a condition by varying a control pressure, the combination with means responsive to the value of said condition and adapted on a change in said value to effect an initial change in said control pressure substantially in excess of that required for a relatively slow reduction of said change in value and means responsive to said control pressure and coacting with the first mentioned means to eliminate a substantial fraction of said initial pressure change at a time prior to a substantial reduction in said change in value and dependent on the occurrence of change in the trend of change of said condition of the kind which the initial pressure change tends to produce.

42. Apparatus as specified in claim 41, in which the said change in the trend of change, is the attainment of a predetermined rate of change.

43. Apparatus as specified in claim 41, in which the said change in the trend of change is a reversal in the initial direction of condition change.

44. Apparatus as specified in claim 41, in which the said means responsive to the control pressure is adapted in coaction with the said means responsive to the value of said condition to effect a slow further change in said pressure in the same direction as the said initial change therein prior to the elimination of any fraction of the latter, when the initial rate of change of said condition is in excess of a predetermined rate thereof.

45. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which the adjustable means of said mechanism is adapted to dissimilarly vary the extent of the initial and subsequent adjustments of said valve means produced by said mechanism on a change in said pressure.

46. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which the adjustable means of said mechanism comprises a floating lever, and means for varying the path along which said lever is moved in response to a change in said pressure.

47. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever through which turning movements of the first mentioned lever moves said floating lever and thereby adjusts said valve means, and means adjustable to vary the movement given said floating lever by a turning movement of the first mentioned lever.

48. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a movable member, a floating lever through which movements of said member move said floating lever and thereby adjust said valve means, and guiding means cooperating with said floating lever to control the movement of the latter.

49. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a movable member, a floating lever through which movements of said member move said floating lever and thereby adjust said valve means, and guiding means cooperating with said floating lever to control the movement of the latter, said means being adjustable to vary the movement given said floating lever by said member.

50. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever pivotally connected to the first mentioned lever and through which turning movements of the latter adjust said valve means, and means adjustable to produce variable turning movements of said floating lever about its pivotal connection with the first mentioned lever on a given turning movement of the latter about its axis.

51. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever through which turning movements of the first mentioned lever move said floating lever and thereby adjust said valve means, and guiding means cooperating with said floating lever to control the movement of the latter produced by the first mentioned lever and adjustable to vary the movement of the floating lever produced by a given turning movement of the first mentioned lever.

52. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever pivotally connected to the first mentioned lever through which turning movements of the latter adjust said valve means, a guide pin carried by said lever, and guiding means providing a slot receiving said pin and adjustable to separately vary the positions of the sides of said slot and thereby vary the turning movements of said floating lever about its pivotal connection with the first mentioned lever on a turning movement of the latter about its axis away from and back into a predetermined position of the latter.

53. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever through which turning movements of the first mentioned lever move said floating lever and thereby adjust said valve means, and guiding means cooperating with said floating lever to make the relative movement of the two levers produced by a given turning movement of the first mentioned lever in one direction different from that produced by the same turning movement in the opposite direction.

54. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever pivoted to the first mentioned lever and through which turning movements of the latter adjust said valve means, and a guide adjustable to give the floating lever a variable movement about the axis of its pivot connection with the first mentioned lever on a given turning movement of the latter about the first mentioned axis, said guide being a disc angularly adjustable about its axis and formed with a guideway extending radially to the last mentioned axis, and said floating lever having a portion received in said guideway.

55. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever pivotally connected to the first mentioned lever and through which turning movements of the latter adjust said valve means, a guide part carried by said floating lever and guiding means providing a guideway receiving said part and adjustable to vary the general direction of said guideway and thereby vary the turning movement of said floating lever about its pivotal connection with the first mentioned lever produced by a given turning movement of the latter about its axis.

56. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever pivotally connected to the first mentioned lever and through which turning movements of the latter adjust said valve means, a guide part carried by said floating lever and guiding means providing a guideway receiving said pin and adjustable to vary the width of said guideway and thereby vary the turning movements of said floating lever about its pivotal connection with the first mentioned lever produced by turning movements of the latter in opposite directions about its axis.

57. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a floating lever pivotally connected to the first mentioned lever and through which turning movements of the latter adjust said valve means, a guide part carried by said floating lever and guiding means providing a guideway receiving said pin and adjustable to separately vary the position of each side of said guideway and thereby vary the turning movement of said floating lever about its pivotal connection with the first mentioned lever produced by a turning movement of the latter in either direction about the first mentioned axis.

58. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a part moved in one direction on a change in said pressure to thereby effect said initial adjustment, and means for effecting a slow return movement of said part to thereby effect said second adjustment, and auxiliary means subjecting said part to a force opposing the movement of said part away from an initial position thereof and tending to return it to said position.

59. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises two relatively movable parts, and a lost motion connection through which one of said parts, when moved, gives motion to the other.

60. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprsies two relatively movable parts, and an adjustable lost motion connection through which movement imparted to one of said parts gives motion to the other varying with the adjustment of said connection.

61. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises two relatively movable parts, and a lost motion connection between said parts limiting their relative movement.

62. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism includes two relatively movable parts and a variable lost motion connection between said parts comprising a member mounted on one of said parts for movement about an axis relative thereto and formed with a guideway curved about said axis and varying in width along its length, and the other of said parts having a projection extending into said guideway.

63. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises two relatively movable parts, a pivotal connection between said parts, a lost motion connection between said parts limiting their relative movement about the axis of said pivotal connection, and yielding means acting on one of said parts to produce said relative movement.

64. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a second lever, and a lost motion connection between said levers, through which turning movements of the first mentioned lever move said second lever and thereby adjust said valve means.

65. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which said mechanism comprises a lever turning about a stationary axis, a second lever, a lost motion connection between said levers through which turning movements of the first mentioned lever move said second lever and thereby adjust said valve means, and means tending to return both levers to predetermined normal positions of the latter whenever displaced therefrom.

66. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises mean adjustable to modify the adjustment effect of said mechanism on said valve means in which the adjustable means of said mechanism include provisions adjustable to variably delay the initiation of said initial adjustment, and other provisions separately adjustable to variably delay the initiation of said subsequent adjustment.

67. An air actuated controller comprising an air space, valve means regulating the pressure in said space, a device for adjusting said valve means in accordance with a control condition, and a mechanism which is responsive to changes in said pressure and is actuated on a change therein to give said valve means an initial adjustment tending to a reverse change in said pressure and a subsequent adjustment opposite in direction to said initial adjustment, and which comprises means adjustable to modify the adjustment effect of said mechanism on said valve means in which the adjustable means of said mechanism include provisions adjustable to vary the extent of said initial adjustment and other provisions separately adjustable to vary the extent of said subsequent adjustment.

68. In a measuring and control instrument, the combination with a supporting structure, of mechanism comprising an element adjusted in accordance with changes in the value of the control condition, control mechanism including a pair of cooperating control members adjustable to effect a control action, operating means through which the adjustment of said element adjusts the relation of said members, follow up means actuated proportionally to the adjustment of the member relation by said element, reset means actuated on a departure of said condition from normal and tending to eliminate the effect of the follow up means, a device rotatable about an axis fixed with respect to said structure for adjusting the ratio of the element adjustment to said follow up adjustment, and a device rotatable about an axis fixed with respect to said structure for adjusting the rate of said reset adjustment.

69. In a measuring and control instrument, the combination with a supporting structure of mechanism comprising an element adjusted in accordance with changes in the value of the control condition, control mechanism including a pair of cooperating control members adjustable to effect a control action, operating means through which the adjustment of said element adjusts the relation of said members, follow up means actuated proportionally to the adjustment of the member relation by said element, and a device rotatable about an axis fixed with respect to said structure for adjusting the ratio of the element adjustment to said follow up adjustment.

THOMAS R. HARRISON.

FREDERICK W. SIDE.